US008191765B2

(12) United States Patent
Matsumura

(10) Patent No.: US 8,191,765 B2
(45) Date of Patent: *Jun. 5, 2012

(54) DEVICE AND METHOD FOR CONTROLLING COPYING OPERATION OF DOCUMENT WITH USE OF BARCODE

(75) Inventor: Akari Matsumura, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 12/860,852

(22) Filed: Aug. 20, 2010

(65) Prior Publication Data
US 2010/0314449 A1    Dec. 16, 2010

Related U.S. Application Data

(62) Division of application No. 12/043,924, filed on Mar. 6, 2008, now Pat. No. 7,806,315.

(30) Foreign Application Priority Data

Mar. 13, 2007 (JP) ................................. 2007-063478

(51) Int. Cl.
*G06F 17/00* (2006.01)
(52) U.S. Cl. ............... 235/375; 235/462.01; 235/462.09; 235/470; 235/487; 235/494; 382/183; 382/307; 382/312
(58) Field of Classification Search .................. 235/375, 235/462.01, 462.09, 462.1, 462.11, 470, 235/487, 494; 382/183, 307, 312
See application file for complete search history.

(56) References Cited

U.S. PATENT DOCUMENTS

| 5,621,503 A  * | 4/1997 | Komaki et al. ............... 399/366 |
| 2002/0061120 A1 | 5/2002 | Carr et al. |
| 2003/0147549 A1* | 8/2003 | Choi et al. .................... 382/100 |
| 2003/0159046 A1 | 8/2003 | Choi et al. |
| 2003/0179399 A1* | 9/2003 | Matsunoshita ............. 358/1.13 |
| 2004/0105571 A1* | 6/2004 | Ikenoue et al. ............... 382/100 |
| 2004/0216031 A1* | 10/2004 | Taylor .......................... 715/500 |
| 2005/0021970 A1 | 1/2005 | Reese et al. |
| 2005/0138382 A1* | 6/2005 | Hougaard et al. ............ 713/176 |

(Continued)

FOREIGN PATENT DOCUMENTS

EP         1 333 658        8/2003

(Continued)

OTHER PUBLICATIONS

Japanese Office Action dated May 14, 2010 in corresponding Japanese Patent Application No. 2009-139355.

(Continued)

*Primary Examiner* — Ali Sharifzada
(74) *Attorney, Agent, or Firm* — Fitzpatrick, Cella, Harper & Scinto

(57) ABSTRACT

The present invention provides an image processor capable of preventing illegal copying of a document. The image processor first extracts information from a barcode in a first region of document image data. Then, the image processor extracts information from a barcode in a second region of the document image data if the information is extracted from the barcode in the first region. On the other hand, if the information is not extracted from the barcode in the first region, the image processor does not extract the information from the barcode in the second region of the document image data. This enables a copying operation for a document consisting of a plurality of pages to be efficiently controlled.

4 Claims, 25 Drawing Sheets

U.S. PATENT DOCUMENTS

2005/0219605 A1* 10/2005 Sato .............................. 358/1.14
2006/0197972 A1* 9/2006 Hayashi ....................... 358/1.14

FOREIGN PATENT DOCUMENTS

| EP | 1 718 060 | 11/2006 |
| EP | 1 770 977 | 4/2007 |
| JP | 2001-245144 | 9/2001 |
| JP | 2001-257862 | 9/2001 |
| JP | 2002-305646 | 10/2002 |
| JP | 2004-096229 A | 3/2004 |
| JP | 2004-336806 | 11/2004 |
| JP | 2006-013627 | 1/2006 |

OTHER PUBLICATIONS

Office Action dated Apr. 14, 2009, in JP 2007-063478.
Extended European Search Report, dated Jun. 23, 2008, in EP 08 15 2585.

* cited by examiner

| TYPE | DATA SIZE |
|---|---|
| FIRST INFORMATION | SMALL |
| SECOND INFORMATION | LARGE |

| 00 | 01 | 02 | 03 | 04 | 05 | 06 | 07 |
|----|----|----|----|----|----|----|----|
| ID | | | | | | | COPYING CONDITION |

DEVICE AND METHOD FOR CONTROLLING COPYING OPERATION OF DOCUMENT WITH USE OF BARCODE

This application is a divisional of application Ser. No. 12/043,924, filed Mar. 6, 2008, now allowed, the contents of which are hereby incorporated by reference herein.

BACKGROUND OF THE INVENTION

1. Field of the Invention

The present invention relates to a technique for preventing illegal copying of a document, and more particularly to a technique for controlling a copying operation for a document consisting of a plurality of pages with the use of a barcode.

2. Description of the Related Art

In order to prevent illegal copying of a document, the following method has been proposed: a copying condition indicating whether or not a document is "Copying inhibited" is embedded in the document as image data when the document is created, and then the document is printed out. On the other hand, when the document is copied, a copier detects the copying condition from the printed document, and controls the copying operation (performs the copying operation, or stops the copying operation) according to the copying condition.

For example, Japanese Patent Laid-Open No. 2004-336806 discloses a method in which a copier determines whether or not condition information such as a pin number is embedded in a document to be copied, and if the copying condition is embedded, only permits copying to a valid user by performing user authentication. Also, Japanese Patent Laid-Open No. 2002-305646 discloses a method in which a copier comprises a unit adapted to detect two-dimensionally coded information represented by a specific symbol (secret mark) and a secret level (diagonal pattern) from a document to be copied: if detecting the specific symbol, further detects the secret level; and controls the copying operation on the basis of the secret level. According to this method, it can be determined whether or not the document to be copied requires the control of the copying operation simply by determining whether or not the specific symbol is embedded in the document. Further, Japanese Patent Laid-Open No. 2001-245144 discloses a method comprising: reducing the resolution of a scan image to determine whether or not the image is likely to have a digital watermark; and if it is determined that the image is likely to have the digital watermark, determining whether or not the scan image having the document resolution has the digital watermark.

However, in the method disclosed in Japanese Patent Laid-Open No. 2004-336806, the condition information having a large amount of information has to be read every time the copying is performed, so that copy throughput is reduced. Also, in the method disclosed in Japanese Patent Laid-Open No. 2002-305646, the secret level (corresponding to the above condition information) is read out only if the secret mark is detected, so that copy throughput is high, which is different from the method disclosed in Japanese Patent Laid-Open No. 2004-336806. However, in the case of the method disclosed in Japanese Patent Laid-Open No. 2002-305646, the copier has to be designed to be able to perform the two operations, i.e., the detection of the secret mark and the extraction of the information from the two-dimensional code, and therefore the design becomes complicated. Further, in the method disclosed in the Japanese Patent Laid-Open No. 2001-245114, the processing for extracting the digital watermark present over the entire surface of the image must be performed twice, so that processing speed is significantly reduced.

SUMMARY OF THE INVENTION

An object of the present invention is to provide an image processor and the like, that can prevent illegal copying of a document, and efficiently control the copying operation for a document consisting of a plurality of pages.

An image processor of the present invention comprises an extracting component for extracting information from a barcode in a first region of document image data; and a processing component for extracting information from a barcode in a second region of the document image data when the information is extracted from the barcode in the first region by the extracting component, and not extracting the information from the barcode in the second region of the document image data when the information is not extracted from the barcode in the first region by the extracting component.

An image processor of the present invention comprises an extracting component for extracting information from a barcode in a first region of document image data; and a processing component for determining on the basis of the extracted information whether or not information is extracted from a barcode in a second region of the document image data when the information is extracted from the barcode in the first region by the extracting component, and not extracting the information from the barcode in the second region of the document image data when the information is not extracted from the barcode in the first region by the extracting component.

An image processing method of the present invention comprises an extracting step for extracting information from a barcode in a first region of document image data; and a processing step for extracting information from a barcode in a second region of the document image data when the information is extracted from the barcode in the first region by the extracting step, and not extracting the information from the barcode in the second region of the document image data when the information is not extracted from the barcode in the first region by the extracting step.

An image processing method of the present invention comprises an extracting step for extracting information from a barcode in a first region of document image data; and a processing step for determining on the basis of the extracted information whether or not information is extracted from a barcode in a second region of the document image data when the information is extracted from the barcode in the first region by the extracting step, and not extracting the information from the barcode in the second region of the document image data when the information is not extracted from the barcode in the first region by the extracting step.

A computer-readable recording medium of the present invention comprises computer-executable instructions for performing an extracting step for extracting information from a barcode in a first region of document image data; and a processing step for determining on the basis of the extracted information whether or not information is extracted from a barcode in a second region of the document image data when the information is extracted from the barcode in the first region by the extracting step, and not extracting the information from the barcode in the second region of the document image data when the information is not extracted from the barcode in the first region by the extracting step.

According to the present invention, even if a document consisting of a plurality of pages is copied, illegal copying of the document can be prevented without reducing efficiency of the copying task.

Further features of the present invention will become apparent from the following description of exemplary embodiments (with reference to the attached drawings).

BRIEF DESCRIPTION OF THE DRAWINGS

FIG. 9 is a diagram for explaining a difference in data size between first information and second information;

FIG. 24 is a diagram for illustrating another example of the first information.

DESCRIPTION OF THE EMBODIMENTS

The present invention is now described with reference to the drawings.

First, a system for preventing illegal copying is described.

Figure 1:
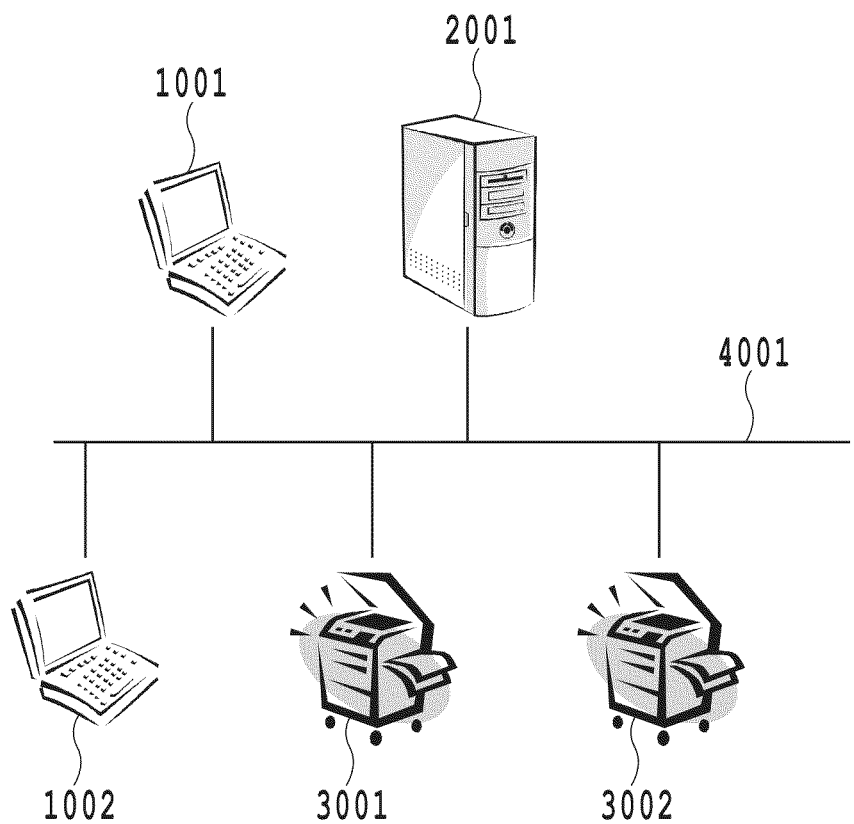
FIG. 1 is a diagram for illustrating an example of a system applicable with the present invention.

FIG. 1 is a schematic view of the system.

The system comprises a client PC 1001, a client PC 1002, a print server 2001, an image processor 3001, and an image processor 3002. Each of the image processor 3001 and 3002 has a copying function and a printing function. Also, each of the devices transmits/receives data via a LAN 4001.

Note that the configuration depicted in FIG. 1 is illustrative, and the number of each of the devices is not limited to that explicitly shown in the diagram. Also, in the following description, the client PC 1001, print server 2001, and image processor 3001 are only referenced for descriptive convenience.

Figure 6:
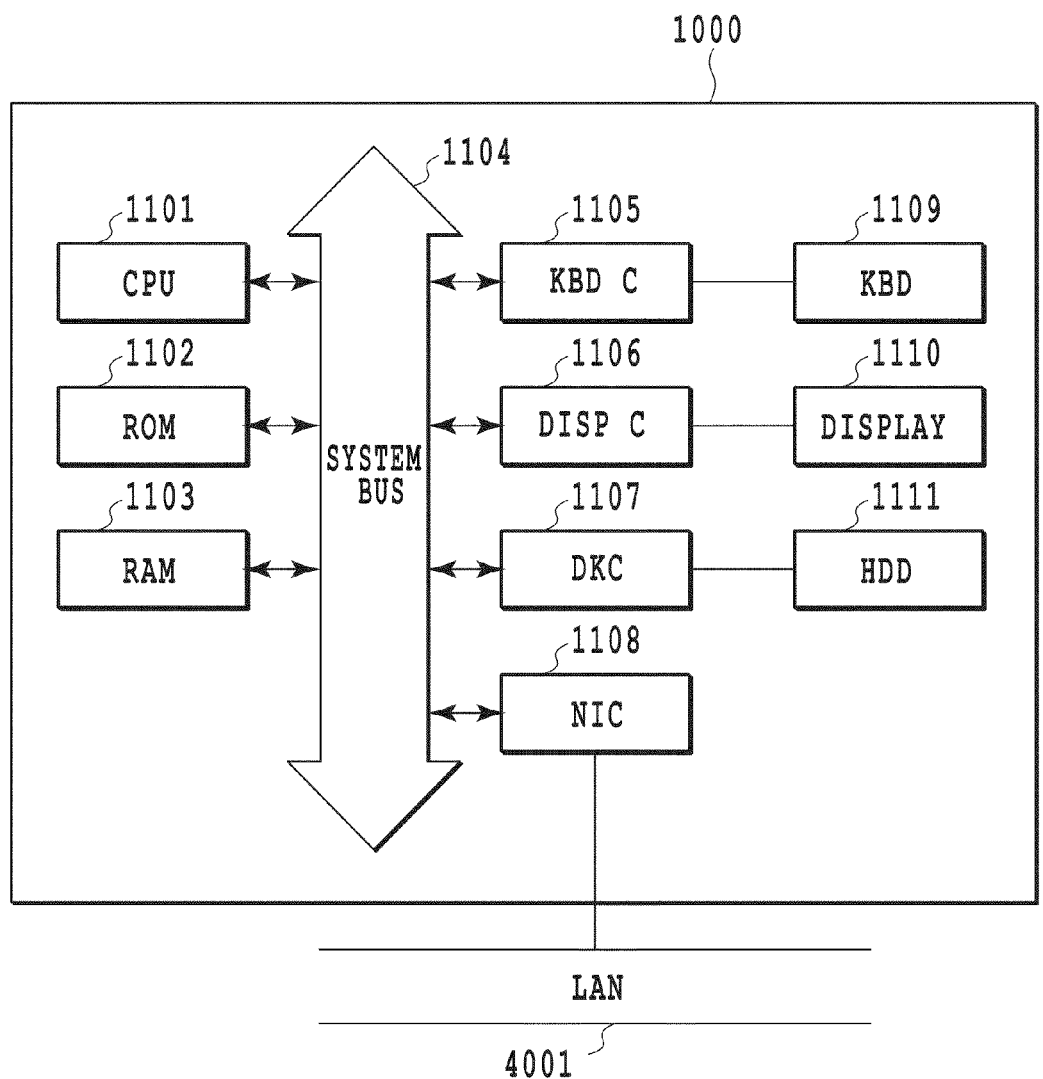
FIG. 6 is a block diagram for illustrating an internal configuration of a PC.

FIG. 6 is a block diagram for explaining an example of a hardware configuration of each of the client PC 1001 and the print server 2001. The client PC 1001 and print server 2001 are hereinafter referred to as an information processor 1000.

Referring to FIG. 6, the information processor 1000 comprises a CPU 1101, a ROM 1102, a RAM 1103, a keyboard controller 1105, a display controller 1106, and a disk controller 1107. The information processor further comprises a network interface card 1108, a keyboard 1109, a display 1110, and a hard disk 1111. Each unit performs data transfer, and the like, via a system bus 1104. Also, the information processor is connected to the LAN 4001 via the network interface card 1108. The CPU 1101 controls each device connected to the system bus 1104.

Figure 7:
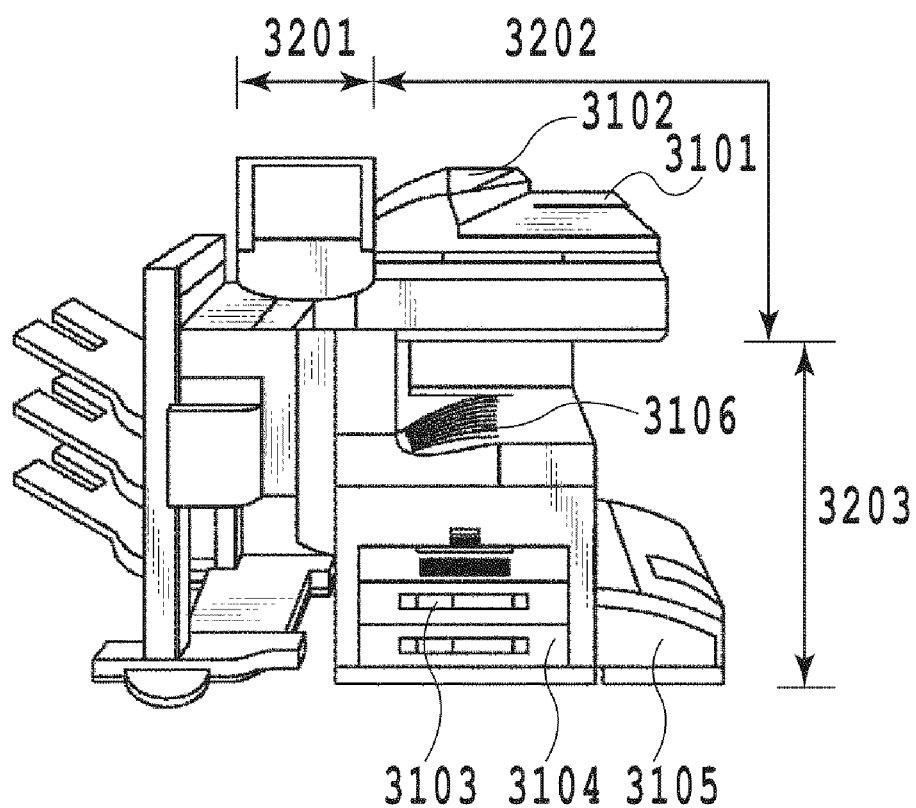
FIG. 7 is a diagram for illustrating an appearance of the image processor.

FIG. 7 is a schematic view of the image processor 3001.

The image processor 3001 comprises an operating unit 3201 providing an user interface screen, a scanner 3202, a printer 3203, a controller (not shown) for controlling the entire device.

The scanner 3202 comprises a tray 3102 and a document feeder 3101. When a user sets a document (print output) to be copied on the tray 3102 of the document feeder 3101, and instructs the operating unit 3201 to start scanning the document, the controller 3300 issues instructions to scan the document to the scanner 3202.

The scanner 3202 that has received the document scanning instruction automatically feeds the document on a sheet-by-sheet basis to perform a scanning operation for the document. A method for scanning the document may be the one placing the document on a glass surface, and moving an exposing unit to scan it.

The printer 3203 forms document image data received from the controller 3303 on paper. The printer 3203 is provided with a plurality of paper cassettes 3103, 3104, and 3105 that enable a different paper size or orientation to be selected. The paper is discharged to a catch tray 3106 after printing thereon.

Figure 8:
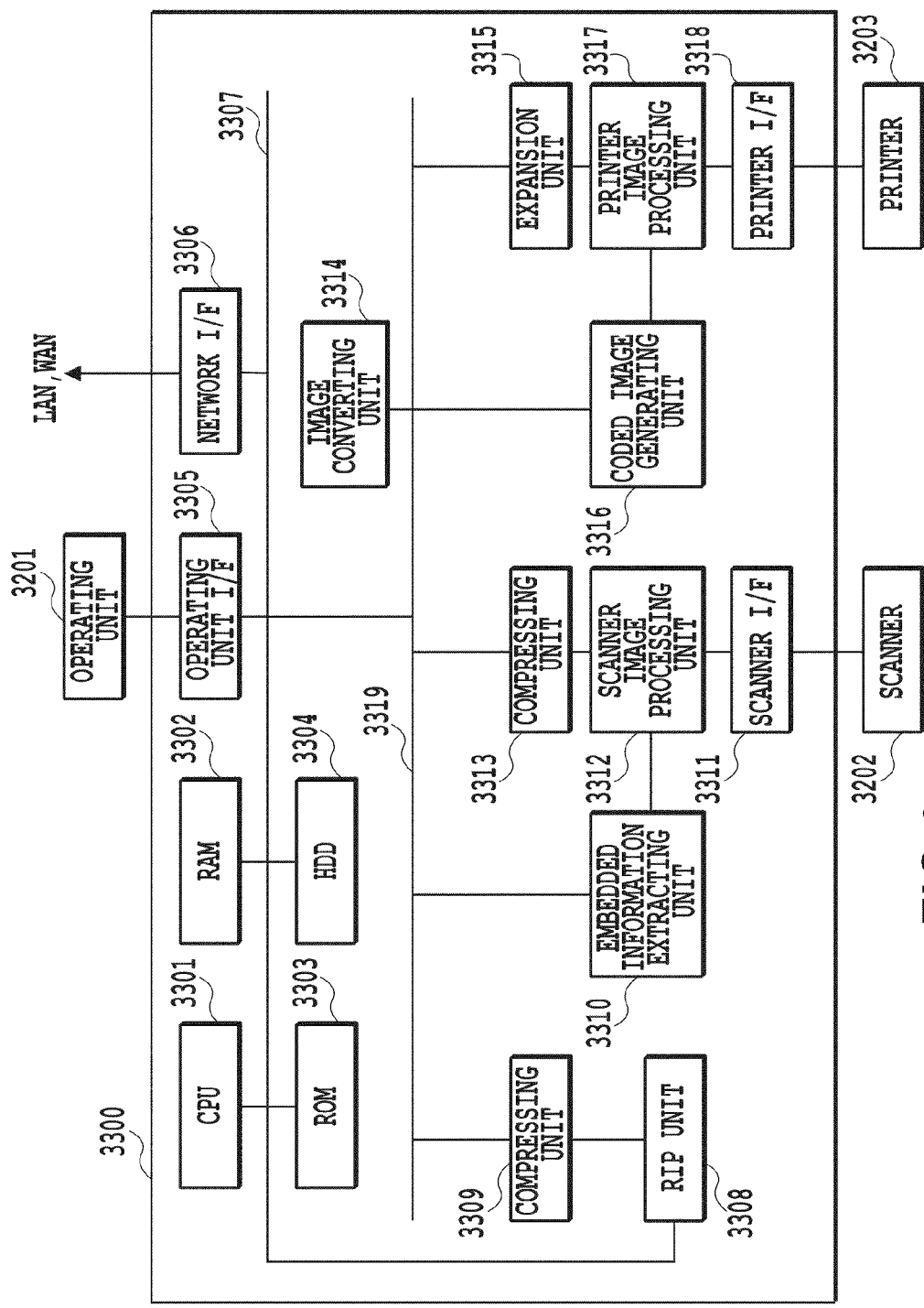
FIG. 8 is a block diagram for illustrating an internal configuration of the image processor.

FIG. 8 is a block diagram for showing an internal configuration of the controller 3300 in the image processor 3001.

The controller 3300 controls the scanner 3202 and the printer 3203. Also, the controller 3300 controls data communication with the client PC 1001 and the print server 2001 via the LAN or WAN.

A CPU 3301 controls access to various devices in connection based on a control program stored in a ROM 3303, and also controls various types of processing performed inside the controller 3300.

A RAM 3302 is a system work memory for the CPU 3301 to operate, and also a memory for temporarily storing the document image data.

A ROM 3303 stores a boot program for the device, and the like.

An HDD 3304 is a hard disk drive, and stores therein a system software and document image data.

An operating unit I/F 3305 is an interface part for connecting between the system bus 3307 and the operating unit 3201. The operating unit I/F 3305 receives from the system bus 3307 the document image data to be displayed on the operating unit 3201, and outputs it to the operating unit 3201 as well as outputting information inputted from the operating unit 3201 to the system bus 3307.

A Network I/F 3306 is an interface board for connecting between the LAN or WAN and the system bus 3307.

An image bus 3319 is a transmission path for communicating the document image data, and is configured with a PCI bus or IEEE 1394.

A scanner image processing unit 3312 corrects, processes, and edits the document image data received from the scanner 3202 via a scanner I/F 3311.

An embedded information extracting unit 3310 performs extraction processing of additional information embedded in a background image of the document image data. Content of the additional information and the extraction processing for the additional information by the embedded information extracting unit 3310 are described later in detail.

A compressing unit 3313 compresses the document image data.

An expanding unit 3315 expands the document image data followed by a raster development, and then transfers the data to a printer image processing unit 3317.

The printer image processing unit 3317 applies image processing to the received document image data with reference to attribute data associated with the document image data.

A coded image generating unit 3316 generates background document image data embedded therein with the additional information, with the use of an information embedding technique to be described later. Then, the printer image processing unit 3317 combines the background document image data with the document image data.

An image converting unit 3314 applies predetermined conversion processing such as rotation, color space conversion, binary/multiple-value conversion, image composition, or thinning to the document image data.

An RIP unit 3308 receives intermediate data generated based on PDL code data that was transmitted from the client PC 1001, and generates bitmap data. The generated bitmap data is compressed at the compressing unit 3309, and then forwarded to the image bus 3319.

Next, a detail of processing performed by each device is described.

When the user performs a printing operation on the client PC 1001, the client PC 1101 generates print data, and transmits it to the print server 2001. If the print server 2001 is absent, the client PC 1001 directly transmits the print data to the image processor 3001.

The print server 2001 transfers the received print data to the image processor 3001.

The image processor 3001 converts the received print data to the document image data, and prints it on paper to thereby output a print.

In the above system, the user makes a setting for embedding the additional information in the print when performing the printing operation on the client PC 1001. After the setting has been made, the image processor 3001 generates the print output including the background image embedded therein with the additional information that has been set.

Figure 2:
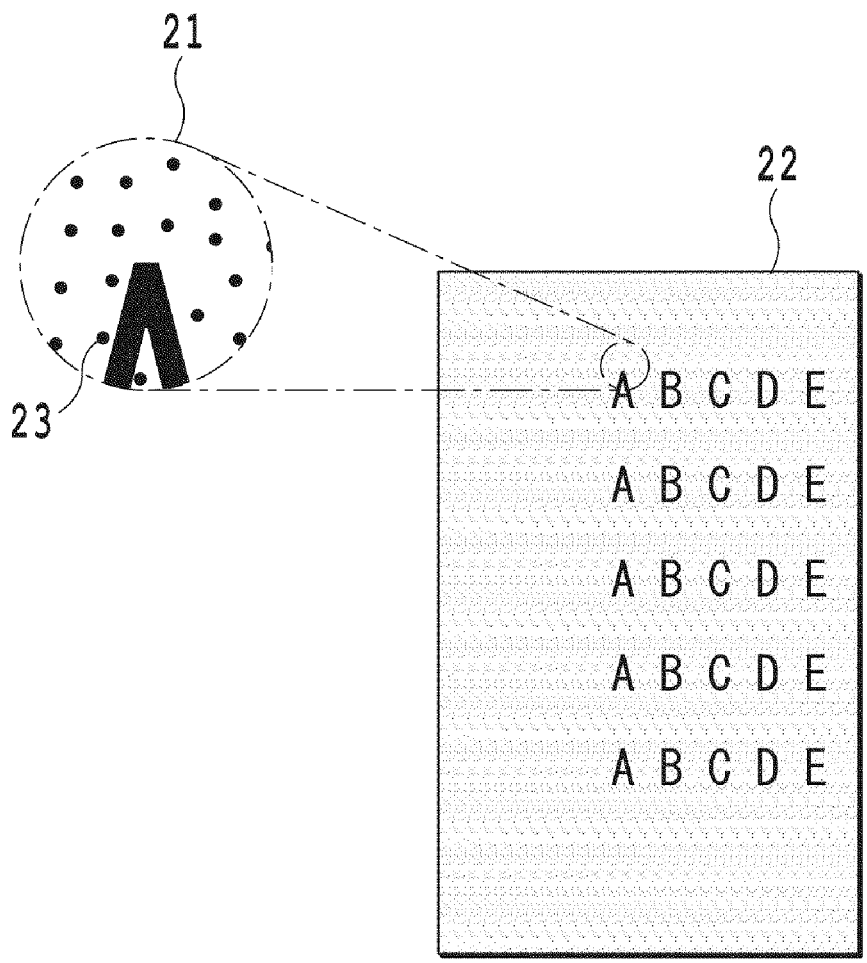
FIG. 2 is a diagram for illustrating an example of a document embedded therein with additional information.

FIG. 2 is a schematic view of the print output including the background image.

In FIG. 2, Reference number 22 represents the entire print output printed thereon with characters "A B C D E", and 21 an enlargement of a part of the print output 22. As seen in the enlarged diagram of Reference number 21, the part of the print output is printed thereon with a part of the characters (part of "A") and a part of the background image 23 that contains a group of dots. That is, the additional information is embedded in the print output in a form of the dot group. The dot group is referred to as LVBC (Low Visibility Barcode).

Figure 21:
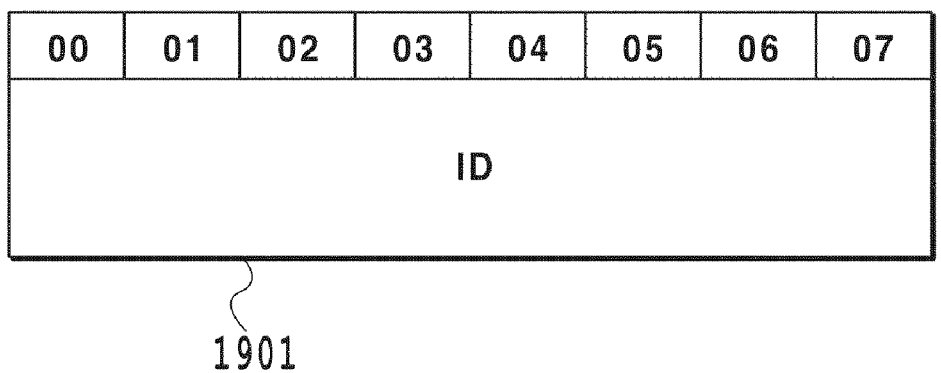
FIG. 21 is a diagram for illustrating an example of the first information.
Figure 22:
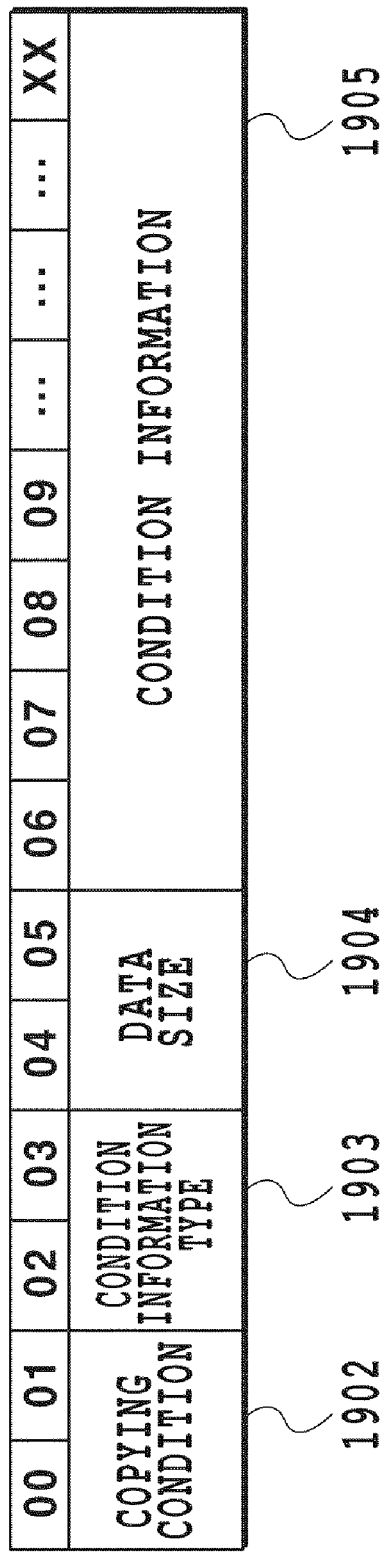
FIG. 22 is a diagram for illustrating an example of the second information.

FIGS. 21 and 22 are diagrams for explaining the additional information. The additional information consists of first information (in this embodiment, identification information (ID) set for each print job) and second information (in this embodiment, copying control information). The first information and the second information are respectively embedded in a first region and a second region both to be described later. FIG. 21 represents the first information, and FIG. 22 the second information. As illustrated in FIG. 22, the copying control information includes a 2-byte copying condition field 1902, 2-byte condition information type field 1903, 2-byte data size field 1904, and condition information (authentication information) field 1905 having a predetermined number of bytes. The copying condition is one such as "Copying permitted", "Copying inhibited", or "Specify condition for permitting copy". The condition information refers to a password, user name, or the like. The condition information type is a type of the condition information. The data size indicates a data size of the condition information.

Using the LVBC enables a composition of the first information and the second information to be embedded in the image as additional information. Also, the LVBC can extract exclusively the first information or the second information, or can select either the extraction of the first information or the second information to extract it, depending on a use mode. Methods for embedding and extracting the additional information with the use of the LVBC are described later.

When the user uses the image processor 1001 to attempt to copy the print output embedded therein with the additional information, the image processor 3001 detects that the additional information is embedded in the print output. Then, the image processor 3001 controls the copying operation according to the copying condition included in the copying control information in the additional information. For example, if the copying condition corresponds to "Copying inhibited", the image processor 3001 stops the copying operation. This prevents the copying-inhibited print output from being copied.

Next, setting processing for the copying control information in the client PC 1001 and the control of the copying operation in the image processor 3001 are described in detail.

Figure 3:
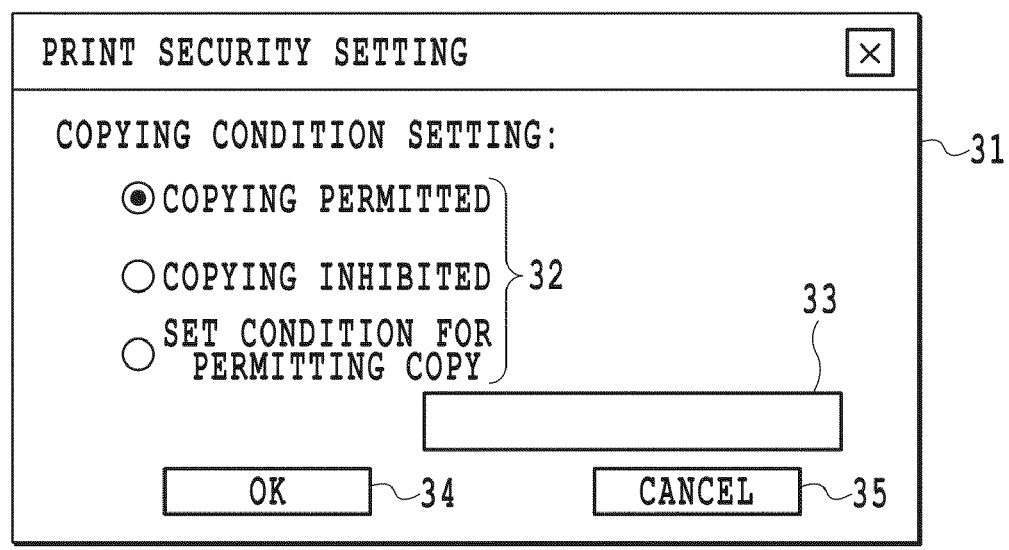
FIG. 3 is a diagram for illustrating an example of a printer driver setting screen.

FIG. 3 is an example of a printing setting screen provided by a printer driver installed in the client PC 1001.

Reference number 31 represents a print security setting dialog box. The user uses the print security setting dialog box 31 to set the copying condition. The user checks a radio button 32 in the print security setting dialog box 31 to thereby select one of the conditions: "Copying permitted", "Copying inhibited", and "Specify condition for permitting copy". The selected condition is embedded as the copying control information in a document to be printed. When "Specify condition for permitting copy" is selected, a condition information input field 33 is brought into an available (enterable) state, and the user inputs the condition information into the field. This condition information is also embedded as the copying control information in the document to be printed. The condition information includes, for example, a password. On the other hand, when the user uses the image processor 3001 to attempt to copy the print output embedded therein with "Specify condition for permitting copy", the image processor 3001 prompts the user to input the condition information. In this case, when the user inputs the condition information, which was inputted into the condition information input field 33 when the user performed the print setting, to the image processor 3001, the copying is permitted. Note that the condition information may be a name of the user having permission for copying. Alternatively, the condition information may be a time period (e.g., from Jan. 17, 2007 to Feb. 17, 2007) during which copying is permitted. If the copying-permitted time period is set as the condition information, the image processor 3001 performs control for only permitting copying to be performed during the time period.

Figure 4:
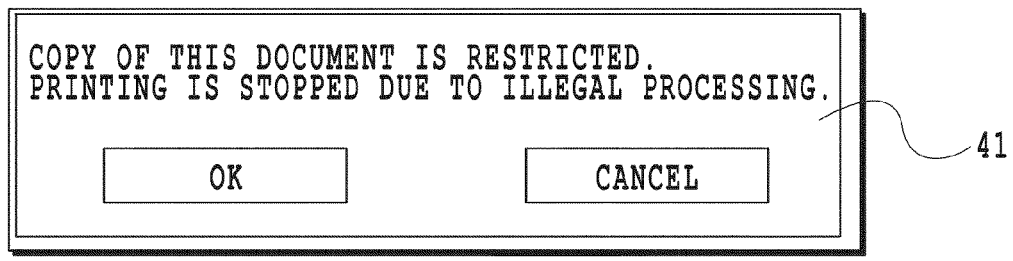
FIG. 4 is a diagram for illustrating an example of a screen displayed when an image processor stops the copying operation.
Figure 5:
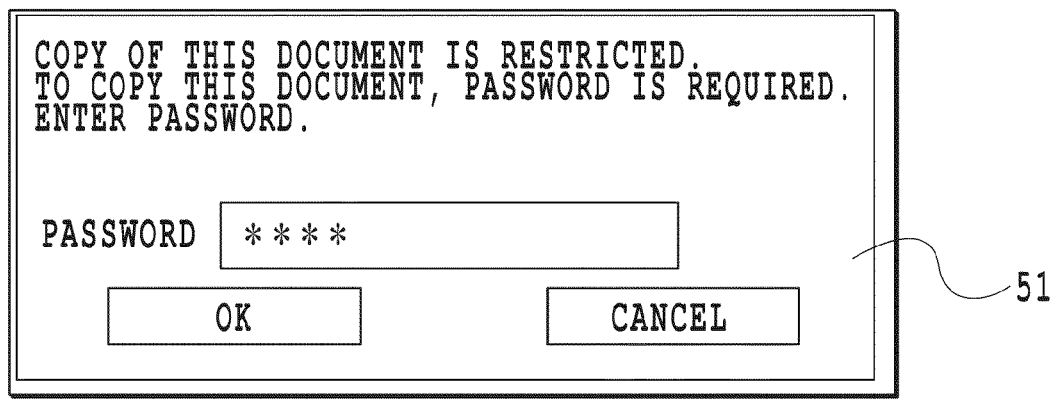
FIG. 5 is a diagram for illustrating an example of a screen displayed when the image processor interrupts the copying operation.

FIGS. 4 and 5 illustrate examples of dialog boxes presented to the user by the image processor 3001 having detected that "Copying inhibited" and "Specify condition for permitting copy" are embedded as the copying control information in the print output to be copied, respectively. One of these dialog boxes is displayed on the operating unit 3201 of the image processor 3001.

FIG. 4 illustrates a dialog box 41 displayed on the operating unit 3201 when the user attempts to copy the printed document embedded therein with "Copying inhibited" as the copying control information. When the image processor 3001 detects that the copying control information representing "Copying inhibited" is embedded in the printed document to be copied, it notifies the user by a message that copying will not be carried out". Accordingly, the user received the notification will give up copying.

FIG. 5 illustrates a dialog box 51 displayed on the operating unit 3201 when the user attempts to copy the printed document embedded therein with "Specify condition for permitting copy" as the copying control information. When the image processor 3001 detects that the copying control information representing "Specify condition for permitting copy" is embedded in the printed document to be copied, it notifies the user by a message that a password should be entered to copy the document. The user having received the notification uses a keyboard in the operating unit 3201, IC card, or the like to enter the password. Then, the image processor 3001 checks the password entered by the user against that embedded in the printed document as the copying control information, and if both of the passwords coincide with each other, it performs the copying operation. On the other hand, if the both do not coincide with each other, and consequently the password authentication fails, the dialog box 41 illustrated in FIG. 4 is displayed on the operating unit 3201.

Figure 20:
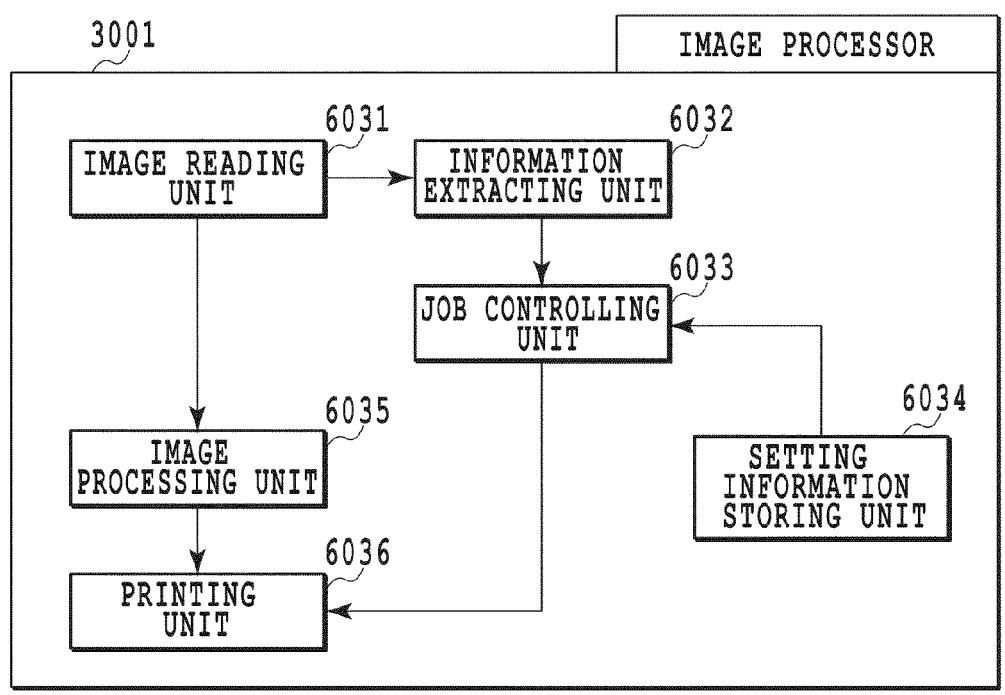
FIG. 20 is a block diagram for illustrating a copying control function in the image processor.
Figure 23:
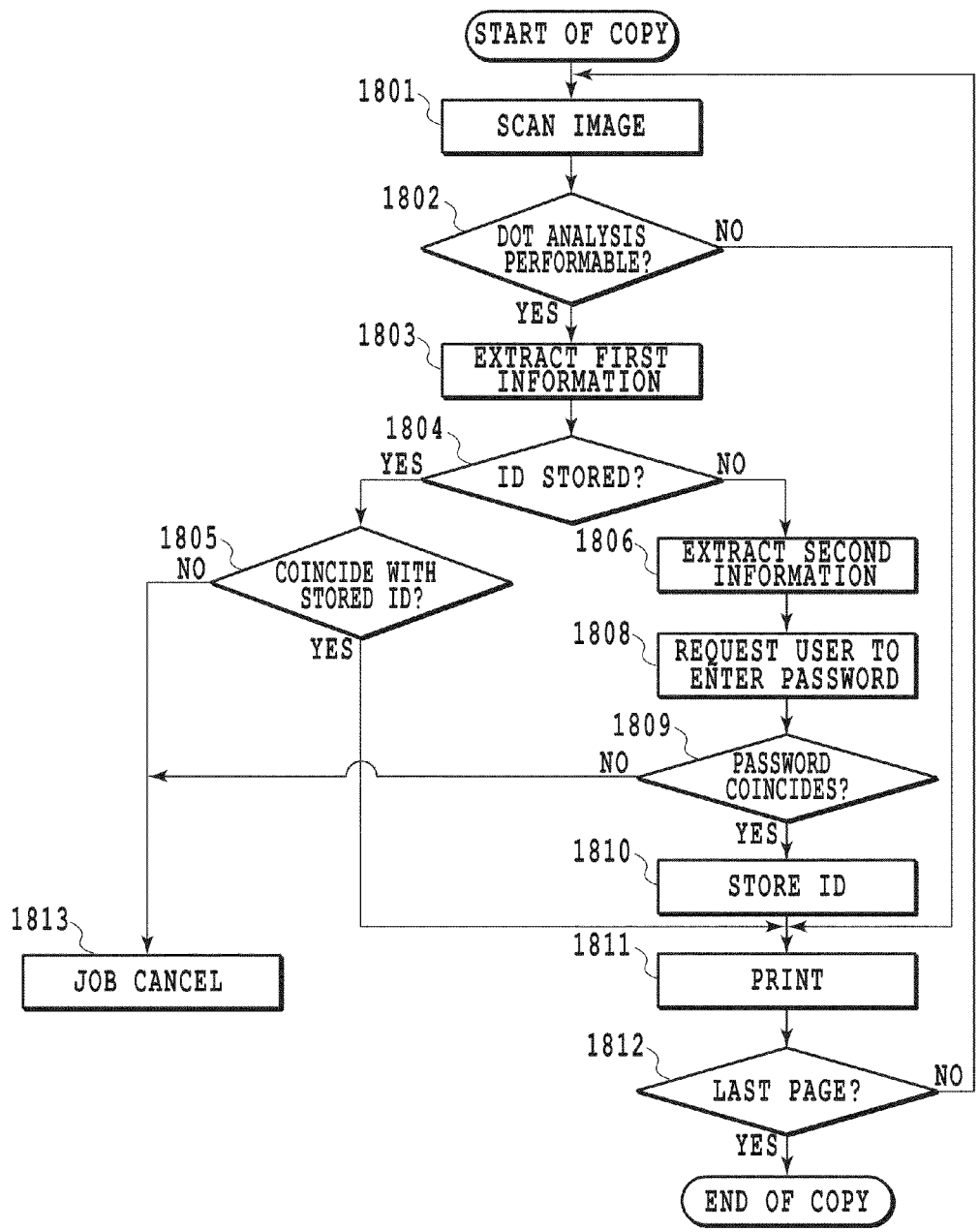
FIG. 23 is a flowchart for illustrating an example of a flow of copying control performed by the image processor.

Next, the control of the copying operation performed by the image processor 3001 provided with a function for preventing illegal copying is described with the use of FIGS. 8, 20, and 23.

FIG. 20 is a block diagram for illustrating a configuration of the image processor 3001.

The image processor 3001 comprises an image reading unit 6031, information extracting unit 6032, job controlling unit 6033, setting information storing unit 6034, image processing unit 6035, and printing unit 6036.

When the user places the document on the document feeder, and instructs from the operating unit 3201 to start copying, the image reading unit 6031 starts reading the document. The image reading unit 6031 sends the read document image data to the image processing unit 6035 and the information extracting unit 6032.

The information extracting unit 6032 controls the embedded information extracting unit 3310 to extract the additional information embedded in the received document image data, and then sends it to the job controlling unit 6033.

The job controlling unit 6033 determines whether or not to stop the copying operation based on the received additional information. If the job controlling unit 6033 determines to stop the copying operation, the job controlling unit 6033 sends an instruction for stopping the copying operation to the printing unit 6036. Further, the job controlling unit 6033 controls the operating unit I/F 3305 to display the dialog box illustrated in FIG. 4 or 5 on the operating unit 3201.

Upon receiving the instruction for stopping the copying operation from the job controlling unit 6033, the printing unit 6036 stops printing even when the printing is in operation.

FIG. 23 is a flowchart for describing a flow of the copying control performed by the image processor 3001.

In Step 1801, when the user instructs from the operating unit 3201 to start copying, the scanner 3202 scans the document, and sends the scanned document image data to the information extracting unit 6032 and the image processing unit 6035. Note that upon receiving the document image data from the image reading unit 6031, the image processing unit 6035 starts applying to the document image data image processing (such as half-toning) that is necessary for the printing unit 6035 to print, although this is not shown in FIG. 23.

In Step 1802, the information extracting unit 6032 determines whether or not the additional information is embedded in the received document image data. The determination whether or not the additional information is embedded is made by determining whether or not a dot analysis can be performed. If the dot analysis can be performed, it is determined that the additional information is embedded, whereas if the dot analysis cannot be performed, it is determined that the additional information is not embedded. This determination method is described later in detail.

If the dot analysis cannot be performed, i.e., if the information extracting unit 6032 determines that the additional information is not embedded, the flow proceeds to processing in Step 1811. On the other hand, if the dot analysis can be performed, i.e., the information extracting unit 6032 determines that the additional information is embedded, the flow proceeds to processing in Step 1803.

In Step 1803, the information extracting unit 6032 extracts from the document image data the identification information (ID) that is the first information.

In Step 1804, the job controlling unit 6033 determines whether or not the identification information (ID) is stored in the image processor 3001, and if it is stored, the flow proceeds to processing in Step 1805, whereas if it is not stored, the flow proceeds to processing in Step 1806.

In addition, if the document corresponds to a first page, and the flow has reached Step 1804, the flow will proceed to the processing in Step 1806 because the identification information is not stored without doubt. On the other hand, if the document corresponds to a second page or later, and the document has a previous page having passed through Step 1810, the flow will proceed to the processing in Step 1805.

As described, in this embodiment, if the identification information in any page is stored in Step 1810, the flow will inevitably move from Step 1804 to Step 1805, or from Step 1802 to Step 1811, with respect to pages after the any page.

Accordingly, when the document consists of a plurality of pages, it can be said that the second information is extracted only once. Therefore, the control of this embodiment allows the number of extractions of the second information, which have taken long in the conventional manner, to be reduced.

In Step 1805, identification information determining unit (not shown) in the job controlling unit 6033 compares the identification information (ID) extracted from the document image data with that (ID) stored in the image processor, and determines whether or not the both coincide with each other. If the both coincide with each other as a result of the comparison, the flow proceeds to the processing in Step 1811, whereas if the both do not coincide with each other, the flow proceeds to processing in Step 1813.

In Step 1813, the job controlling unit 6033 decides to stop the copying operation, and stops the copying operation by canceling the job. At this time, the job controlling unit 6033 displays the dialog box shown in FIG. 4 on the operating unit 3201 to inform the user that the printing is stopped.

In Step 1806, the information extracting unit 6032 extracts the second information (copying control information) from the document image data.

In Step 1808, if the condition information type included in the copying control information is password, the job controlling unit 6033 displays the dialog box shown in FIG. 5 on the operating unit 3201, and requests the user to enter the password.

In Step 1809, the job controlling unit 6033 compares the password entered from the operating unit 3201 by the user with that in the copying control information. If the both coincide with each other as a result of the comparison, the flow proceeds to processing in Step 1810, whereas if the both do not coincide with each other, the flow proceeds to the processing in Step 1813.

In Step 1810, the job controlling unit 6033 stores in the image processor the identification information (ID) as the first information extracted from the document image data.

In Step 1811, the job controlling unit 6033 instructs the printing unit 6036 to start printing the document image data if the printing unit 6036 has already received the document image data from the image processing unit 6035, and the flow returns to Step 1801 to read the next page. On the other hand, if the printing unit 6036 has not yet received the document image data from the image processing unit 6035, the printing unit 6036 waits until the image processing in the image processing unit 6035 is completed.

In Step 1812, the job controlling unit 6033 determines whether or not a page to be printed corresponds to a last page, and if it corresponds to the last page, it ends the copying operation as well as deleting the stored ID.

As described above, in this embodiment, the identification information (ID) extracted from the document image data is used to perform the copying control of the document which consists of a plurality of pages. That is, the identification information (ID) is extracted from the document image data in the first page, and it is determined whether or not the identification information (ID) is stored in the image processor. If the identification information (ID) is stored in the image processor, the identification information (ID) and that (ID) extracted from the document image data in the first page are compared with each other. If the both coincide with each other as a result of the comparison, the copying operation for the first page is performed, and a copy of the first page is outputted. If the both do not coincide with each other, the copying operation is stopped.

On the other hand, if the identification information (ID) is not stored in the image processor, the authentication is performed with the password or the like. If copying by the valid user is verified on the basis of the authentication, the identification information (ID) extracted from the document image data in the first page is stored in the image processor, and the copying operation for the first page is performed to output the copy of the first page. Then, when the second page is copied, the identification information (ID) embedded in the document image data in the second page and that (ID) having been stored in the image processor when the first page was copied are compared with each other, and if the both coincide with each other, the copying operation is performed, and a copy of the second page is outputted. If the both do not coincide with each other, the copying operation is stopped. That is, when the second page is copied, it is determined on the basis of a result of the determination using the identification information (ID) whether to perform or stop copying operation, and the authentication using the password or the like is not performed. For copying of a third page or later, processing the same as that for the copying of the second page is performed.

As a result of such control, if the document consists of a plurality of pages, the second information is extracted only once, as described above. The one-time extraction as described is to reduce the number of extractions of the second information, which takes long in the conventional manner.

If a plurality of sheets of documents include a document that has a different ID from that of the rest, this is highly likely due to a mistake made by a person who placed these documents on the scanner. Even if such a mistake is made, the job can be cancelled by performing the control described in this Embodiment 1, and therefore useless printing can be avoided. Next, another embodiment is described.

The previously described embodiment included the ID (identification information) as the first information. On the other hand, this embodiment includes the ID and the copying control information ("Copying permitted", "Copying inhibited", or "Specify condition for permitting copy) set in the dialog box illustrated in FIG. 3 as the first information.

Figure 25:
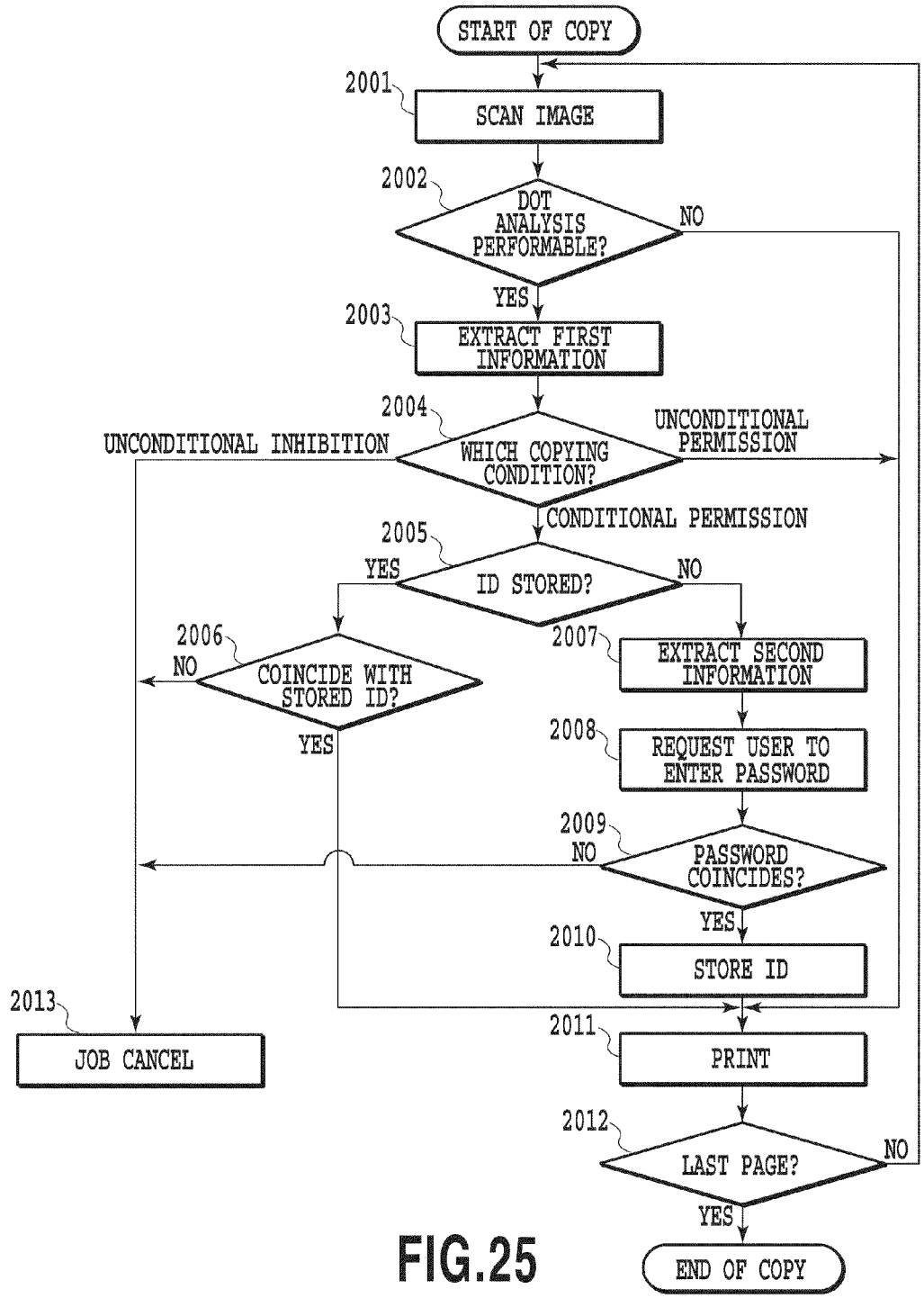
FIG. 25 is a flowchart for illustrating another example of the flow of the copying control performed by the image processor.

For this purpose, FIG. 25 illustrating a flow of this embodiment includes Step 2004, unlike FIG. 23 illustrating the flow of the previous embodiment.

FIG. 24 depicts the first information. In this embodiment, the first information is stored in 7-byte identification information (ID) field 1901 and 1-byte copying condition field 1902. The copying condition corresponds to any one of "Copying permitted", "Copying inhibited", or "Specify condition for permitting copy".

Second information is essentially the same as that illustrated in FIG. 22; however, the copying condition field 1902 may be deleted.

FIG. 25 is a flowchart for illustrating the flow of copying control performed by the image processor 3001.

In Step 2001, when the user instructs from the operating unit 3201 to start copying, the scanner 1801 scans the document, and sends the scanned document image data to the information extracting unit 6032 and the image processing unit 6035. Note that upon receiving the document image data from the image reading unit 6031, the image processing unit 6035 starts applying to the document image data the image processing (such as half-toning) that is necessary for the printing unit 6035 to print, although this is not illustrated in FIG. 25.

In Step 2002, the information extracting unit 6032 determines whether or not the received document image data is embedded therein with the additional data. This determination method is the same as that in the previously described embodiment. If it is determined that the additional information is not embedded, the flow proceeds to processing in Step 2011, whereas if it is determined that the additional information is embedded, the flow proceeds to processing in Step 2003.

In Step 2011, the printing unit 6036 prints the document image data, and continues scanning of pages until printing of the last page is completed.

In Step 2003, the information extracting unit 6032 extracts the first information from the document image data.

In Step 2004, the job controlling unit 6033 determines the copying condition, and if the copying condition corresponds to "Copying permitted" (unconditional permission of copying), the flow proceeds to the processing in Step 2011. If the copying condition corresponds to "Copying inhibited" (unconditional inhibition of copying), the flow proceeds to processing in Step 2013. Further, if the copying condition corresponds to "Specify condition for permitting copy" (conditional permission of copying), the flow proceeds to processing in Step 2005.

In Step 2013, the job controlling unit 6033 decides to stop the copying operation, and stops the copying operation by canceling the job. At this time, the job controlling unit 6033 displays the dialog box illustrated in FIG. 4 on the operating unit 3201 to notify the user that the printing is stopped.

In Step 2005, the job controlling unit 6033 determines whether or not the identification information (ID) is stored in the image processor, and if it is stored, the flow proceeds to processing in Step 2006, whereas if it is not stored, the flow proceeds to processing in Step 2007.

In Step 2006, the job controlling unit 6033 compares the identification information (ID) extracted from the document image data with that stored in the image processor. If the both coincide with each other as a result of the comparison, the flow proceeds to the processing in Step 2011, whereas if the both do not coincide with each other, the flow proceeds to the processing in Step 2013.

The identification information (ID) is information representing association between pieces (pages) of the document image data. That is, the document image data in each page of one document consisting of a plurality of pages is embedded therein with the same identification information (ID). Accordingly, if the identification information (ID extracted from the document image data in a page that is currently in progress is the same as that (ID) having been extracted from the document image data in a previous page having been processed, the second information is not extracted.

In Step 2007, the information extracting unit 6032 extracts the second information from the document image data, and obtains the condition information type from the second information.

In Step 2008, if the condition information type is password, the job controlling unit 6033 displays the dialog box illustrated in FIG. 5 on the operating unit 3201 to request the user to enter the password.

In Step 2009, the job controlling unit 6033 compares the password entered from the operating unit 3201 by the user with the password extracted from the document image data. If the both coincide with each other as a result of the comparison, the flow proceeds to processing in Step 2010, whereas the both do not coincide with each other, the flow proceeds to the processing in Step 2013.

In Step 2010, the job controlling unit 6033 stores in the image processor the identification information (ID) extracted from the document image data.

In Step 2011, the job controlling unit 6033 instructs the printing unit 6036 to start printing the document image data if the printing unit 6036 has already received the document image data from the image processing unit 6035, and the flow returns to Step 2001 where the next page is scanned. On the other hand, if the printing unit 6036 has not yet received the document image data from the image processing unit 6035, the printing unit 6036 waits until the image processing in the image processing unit 6035 is completed.

In Step 2012, the job controlling unit 6033 determines whether or not a page to be printed corresponds to the last page, and if it corresponds to the last page, it ends the copying operation as well as deleting the stored ID.

Thus, in this embodiment, only if the copying condition included in the first information corresponds to "Specify condition for permitting copy", the second information is extracted from the document image data to control the copying operation. That is, the first information is extracted from the document image data, and if the copying condition included in the first information corresponds to "Copying permitted", the second information is not extracted. For this reason, it becomes possible to prevent illegal copying more efficiently than in Embodiment 1.

Next, the method for embedding the additional information consisting of the first information and the second information in the document image data with the use of LVBC (Low Visibility Barcodes) is described.

The LVBC has the following characteristics:
(1) Paper can be embedded therein with a sufficient amount of information.
(2) Information embedded in paper with the use of a color material can be extracted as digital information.
(3) The LVBC has resistance to factors preventing information from being extracted, such as blunting and noise of a signal due to rotation, enlargement, reduction, partial deletion, copy of a document, when the document is copied.
(4) A time period for extracting information from paper is short.

Note that the requirement for (1) and that for (4) contradict each other, and with an increasing amount of information to be embedded, the time period for extracting the information becomes longer.

FIG. 2 illustrates an appearance of a sheet of paper embedded therein with the additional information with the use of the LVBC.

Figure 10:
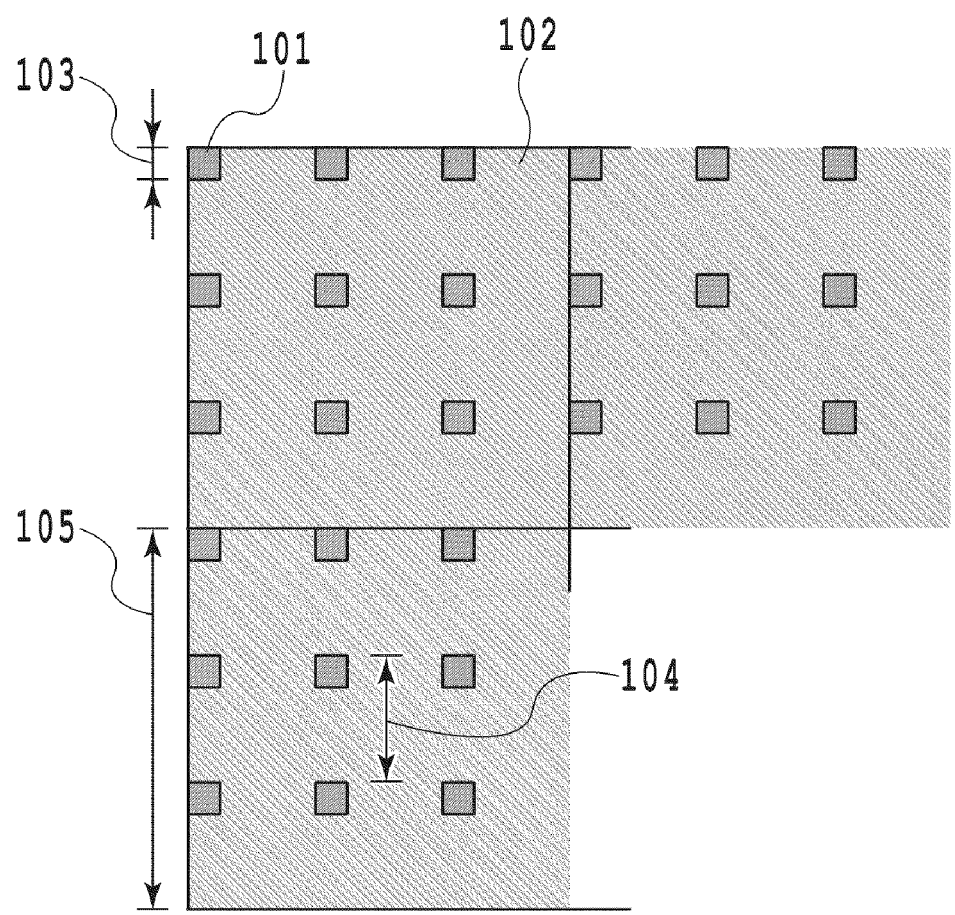
FIG. 10 is a diagram for illustrating locations of a first region and a second region.

FIG. 10 illustrates a state of information being embedded in an image with the use of the LVBC.

A region embedded therein with the first information is supposed to be a first region, and that embedded with the second information be a second region. As illustrated in FIG. 9, a data size of the first information is small, and that of the second information is large. Also, as described above, if the copier recognizes presence of the first information upon copying, the first information is inevitably extracted. On the other hand, even if the copier recognizes presence of the second information, the second information is not necessarily extracted.

A square region indicated by Reference number 101 represents the first region. There is a plurality of the first regions 101, and the respective first regions 101 are repeatedly defined on the image at regular intervals. All of the first regions 101 are embedded with the same data. The reason why the plurality of first regions 101 is provided is to increase redundancy to thereby improve resistance to noise or error.

A region indicated by Reference number 102 represents the second region. There is also a plurality of the second regions. The second regions 102 correspond to regions other than the first regions 101, and the first and second regions do not overlap each other. Reference number 103 represents a size of the first region, 104 the repetition interval, and 105 a size of the second region.

Next, the method for embedding the additional information in the document image data in the form of the dot group with the use of the LVBC is described. In the LVBC, the dot group referred to as a grid is embedded in the document image data.

Figure 11:
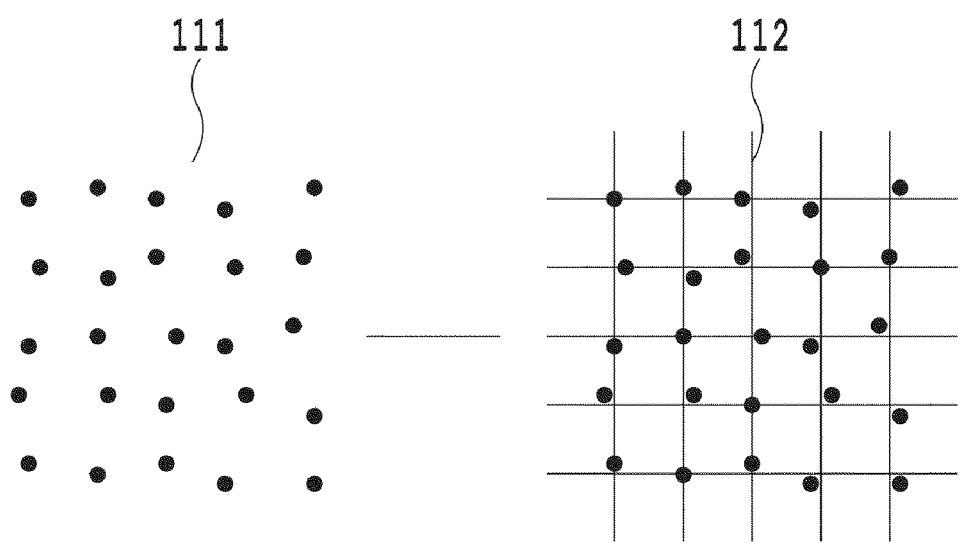
FIG. 11 is a diagram for explaining a grid for a dot group.

In FIG. 11, Reference number 112 represents the grid. Note that the grid is virtual, and is not actually present on the paper.

The additional information is inputted as binary data with a certain size or less. The additional information is embedded in the document image data by displacing the group of dots located at intersection points of the grid in any of eight directions (by shifting the dots from the intersection points).

Figure 12:
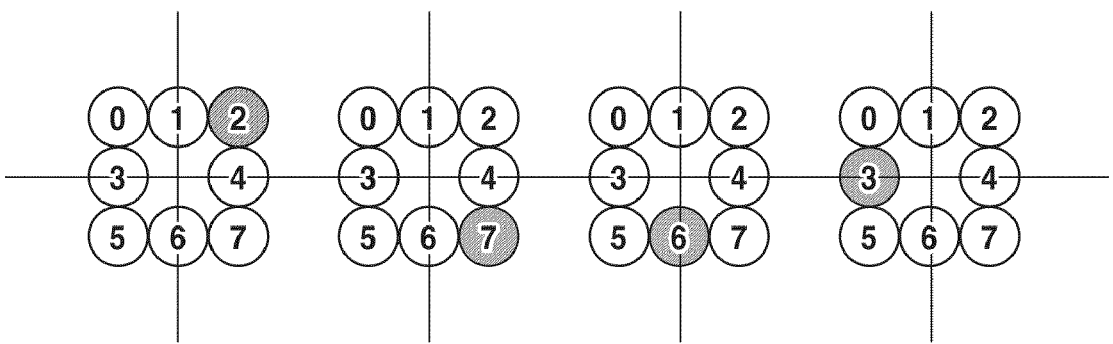
FIG. 12 is a diagram for illustrating that a displacement of the grid represents data.

FIG. 12 is a diagram for describing a method for embedding binary data "010111110011b" as the additional information. Decomposing "010111110011b" on a 3-bit basis results in "010", "111", "110", and "011". Further, applying binary-to-decimal conversion to the respective pieces of 3-bit data results in "2", "7", "6", and "3". As shown in FIG. 12, by displacing each dot on the grid in a direction corresponding to each numeral value, the additional information is embedded. For example, if the additional information corresponding to "2", "7", "6", or "3" is embedded in the document image data as the dots, each dot is displaced to an upper right position (position indicated by "2"), lower right position (position indicated by "7"), downward position (position indicated by "6"), or left position (position indicated by "3") of a corresponding one of the intersection points of the grid. Such processing is repeatedly performed over the entire image. Doing so enables the additional information to be embedded in the document image data as a dot pattern. Also, by repeatedly embedding such dot group in a plurality of areas of the document image data, a false recognition rate in reading the additional information can be reduced even if the paper is dirty, wrinkled, or partially damaged.

To analyze the LVBC, it is necessary to accurately grasp a position of the grid. For this purpose, preferably the displaced dots in the group appear in the eight directions with the same probability. However, if specific data (e.g., "0") is embedded, the dots in the group do not appear in the eight directions with the same probability, as can be seen from the fact that the dots in the group are equally displaced to upper left positions (position indicated by "0") of the respectively corresponding intersection points of the grid. Therefore, by applying scramble processing (e.g., common key encryption processing) having reversibility to information to be embedded, the displacement of the dot group can also be randomized.

Alternatively, the grid with a minimum size, which can represent the additional information, may be generated as a tile pattern, and the tile pattern maybe repeatedly attached onto the paper at the time of actual printing.

In addition, the embedding of the additional information with the use of the LVBC is based on a method in which the additional information consisting of digital data is converted into analog data, and the converted data is recorded on the paper, and therefore can be provided by a simple mechanism.

Next, the processing for the embedded information extracting unit 3310 of the controller 3300 to extract the additional information from the document image data is described with the use of the drawings.

Figure 13:
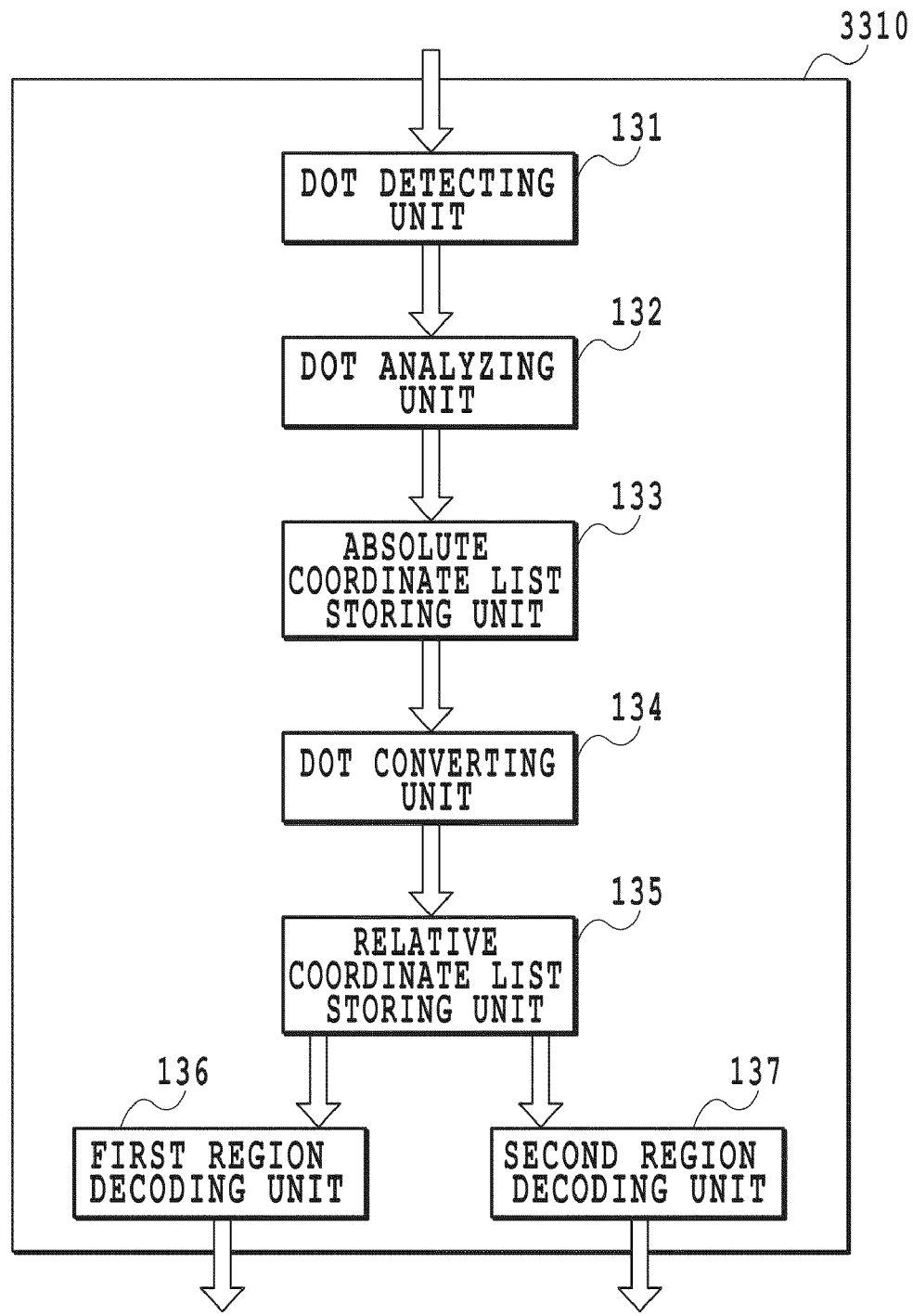
FIG. 13 is a block diagram of an embedded information extracting unit.

FIG. 13 is a block diagram illustrating an example of a configuration of the embedded information extracting unit 3310 that performs the analysis of the LVBC.

The embedded information extracting unit 3310 comprises a dot detecting unit 131, a dot analyzing unit 132, an absolute coordinate list storing unit 133, a dot converting unit 134, a relative coordinate list storing unit 135, a first region decoding unit 136, and a second region decoding unit 137.

The dot detecting unit 131 extracts a plurality of dot groups from the document image data embedded therein with the additional information, and converts them into coordinate information. The dot analyzing unit 132 removes unnecessary dot groups forming half tone patterns, from the plurality of dot groups extracted by the dot detecting unit 131. The absolute coordinate list storing unit 133 stores therein as an absolute coordinate list of the plurality of dot groups analyzed by the dot analyzing unit 132. The dot converting unit 134 detects rotation angles and grid intervals from the list of the absolute coordinates stored by the absolute coordinate list storing unit 133, and converts them into relative coordinates to grid positions. The relative coordinate list storing unit 135 stores therein the relative coordinates outputted by the dot converting unit 134. The first region decoding unit 136 extracts the first information from the first region as the additional information, and outputs a result of the extraction. The second region decoding unit 137 extracts the second information from the second region as the additional information, and outputs a result of the extraction, only if necessary (Step 1804 to Step 1806 in FIG. 23, Step 2005 to Step 2007 in FIG. 25).

The above processing is specifically described below.

The dot detecting unit 131 receives in a form of multi-valued monochromatic image data a signal of the image scanned by an optical scanner. The additional information is, as shown in FIG. 2, embedded with the use of the LVBC in a form of the monochromatic binary dot group. However, the received signal is influenced by a loading state of toner at the time of the embedding, handling of the paper, optical system at the time of scanning, and the like, to be thereby brought into a finely clouded state. Accordingly, to eliminate such influence, isolated points on the image are checked from the received document image data to detect the dot group, and a barycentric position of the detected dot group is recognized as a coordinate position to thereby increase extraction accuracy. The dot detecting unit 131 also measures a dot shape and dot density in the dot group. The absolute coordinates, dot shapes, and dot densities of all of the dot groups, which have been calculated by the dot detecting unit 131, are sent to the dot analyzing unit 132.

The dot analyzing unit 132 removes unnecessary dot groups from the dot groups extracted by the dot detecting unit 131. The dot groups detected by the dot detecting unit 131 are ideally LVBC dot groups; however, practically, dot groups presenting half tone patterns included in the printed document, and isolated points (such as a voiced sound symbol for hiragana (Japanese syllabary characters)) originally included in the document are also included. Accordingly, in order to remove such isolated points similar to the LVBC dot group, the half tone patterns are removed.

Figure 14:
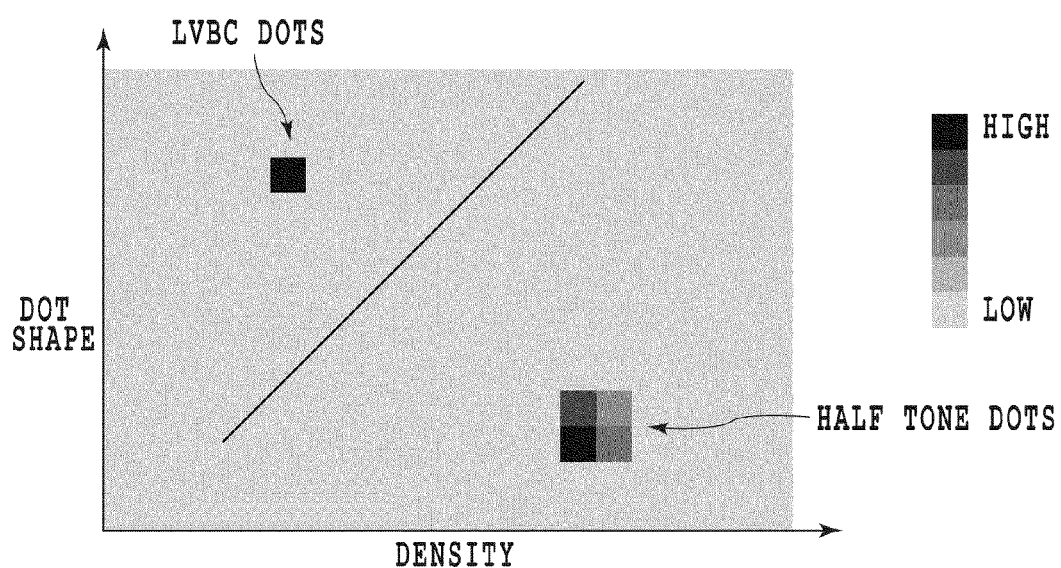
FIG. 14 is a diagram for illustrating a graph for explaining removal of a half tone pattern.

FIG. 14 is a graph for describing the removal of the half tone pattern.

The vertical axis of the graph represents the dot shape in the dot group, and the horizontal axis the dot density. Also, a histogram that represents the frequency of the dot group is depicted for the density of a point. It illustrates that the higher the density of a point, the higher the appearance frequency of the dot group. In the case of the LVBC dot group, when the embedding is performed, the dot shapes and densities in the dot groups are equalized for the embedding, so that the appearance frequency of the LVBC dot group has a peak within a narrow area of the graph (location of "LVBC dot" in FIG. 14). On the other hand, in the case of the half tone pattern, the dot shapes and densities are not normalized, so that the half tone patterns appear sparsely in a large area of the graph, and have a relatively low appearance frequency (location of "half tone dots" in FIG. 14). Such character is used to identify the dot group with the appearance frequency that has the peak within the narrow area of the graph as LVBC dot groups, and the absolute coordinate of the dot group is stored in the absolute coordinate list storing unit 133, whereas the dot groups other than the dot group are eliminated. Based on this processing, almost only the LVBC dot groups are stored in the absolute coordinate list storing unit 133.

The dot converting unit 134 detects the rotation angle and grid interval from the list of the absolute coordinate, which is stored in the absolute coordinate list storing unit 133, and converts it into the relative coordinate from the grid position.

A result of the conversion is stored in the relative coordinate list storing unit 135. An angle at which the LVBC dot group is embedded in the paper and that of the scanned image are different from each other due to a difference in placing orientation on the scanner and a subtle shift in angle at the analog level, so that it is necessary to detect and correct the rotation angle. Also, because, in the LVBC, information is placed on an area shifted from an area for a grid belonged to by a dot group, it is necessary to reproduce the grid, so that the grid interval should be accurately determined.

The grid interval is a distance corresponding to a mode value obtained from a histogram of distances measured over the entire image, each of which is a distance to a neighboring dot measured for each dot.

Regarding the rotation angle of the grid, angles to the neighboring dot groups are measured for all of the dot groups.

Figure 15:
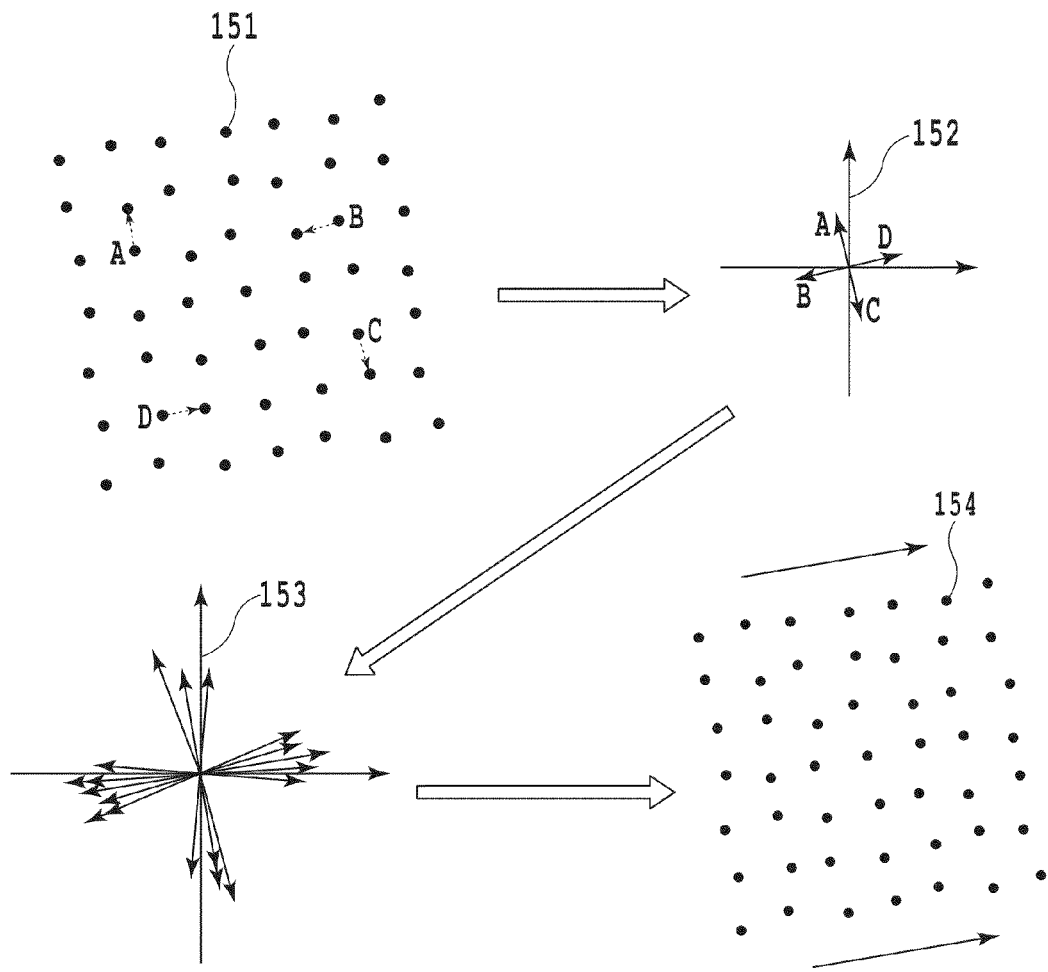
FIG. 15 is a diagram for explaining correction of a rotation angle of the grid.

FIG. 15 is a diagram for describing the correction of the rotation angle of the grid.

Essentially, an angle to a neighboring dot with respect to a dot of interest is any of 0, 90, 180, or 270 degrees, so that correcting a shift in measured angle enables the rotation angle to be determined. Given that a vector formed by the dot of interest and its neighboring dot is (dx, dy), the angle to the neighboring dot with respect to the individual dot of interest can be expressed by the following expression:

$$\theta = a\tan dy/dx$$

Reference number 152 in FIG. 15 represents vectors from dot groups A, B, C, and D to respectively corresponding neighboring dot groups. However, both of the dot of interest and its neighboring dot are slightly displaced from corresponding grid positions in order to embed information, so that θs are measured with respect to all of dots of interest. If appearance probabilities of the displaced positions of the dot of interest and its neighboring dot from the respective grids are longitudinally and laterally the same, rotation angles of the grids can be averagely measured by adding shift amounts of angles of all the dots of interest. Reference number 153 represents vectors for several points, and it turns out that by superposing corresponding angles, the rotation angle of the grid can be approximated. Note that a correction to be obtained for the rotation angle is narrowed down to a 90-degree basis; however, practically, it does not narrow down to any one of the four angles, i.e., 0, 90, 180, and 270 degrees. Such limitation will be described along with the first region decoding unit 136 to be described later.

After the grid interval and rotation angle have been determined, a grid that has the grid interval is virtually drawn as a grid 112 illustrated in FIG. 11, and a displacement of coordinates from a position of the grid to a position of a dot actually placed is measured.

As illustrated in FIG. 12, the conversion into actual data is finally performed from the displacement of the grid.

Next, the method in which the first and second region decoding units 136 and 137 extract the embedded additional information is described.

The first region decoding unit 136 is first described in detail.

The first region decoding unit 136 determines the size 103, repetition size 104, and position of the first region 101, and extracts the additional information embedded in the first region 101.

The repetition size 104 of the first region 101 is first determined. Because all of the first regions 101 include the same data, if autocorrelating is performed with a given offset in a longitudinal direction of the paper, the autocorrelativity increases when the offset value coincides with the repetition size 104. Accordingly, the repetition size 104 can be determined on the basis of the offset at which the autocorrelativity becomes highest.

Figure 16:
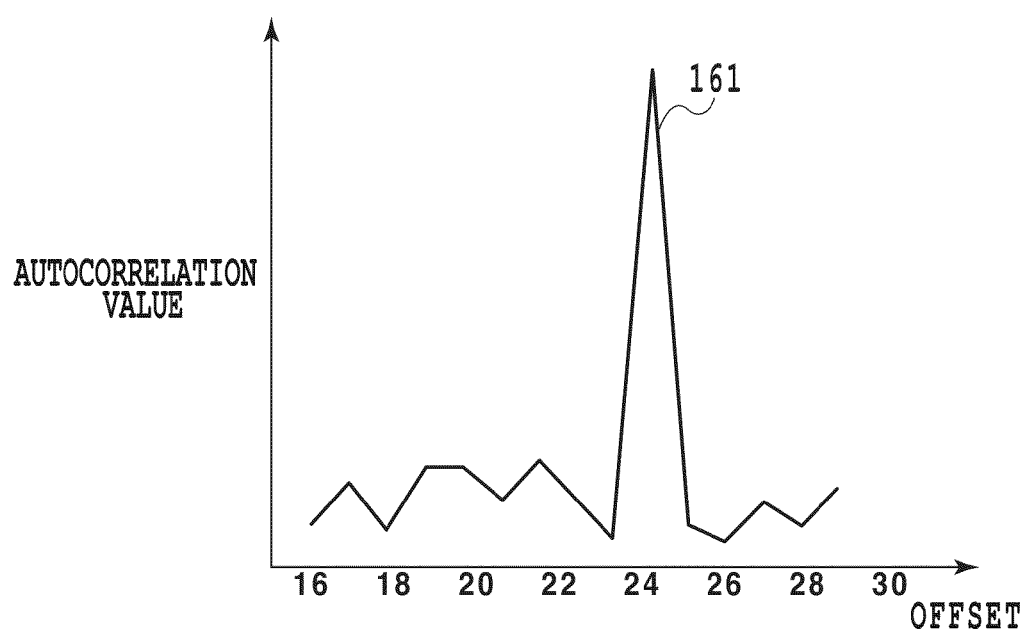
FIG. 16 is a diagram for illustrating a graph that represents an autocorrelation value at an offset value in the first region.

FIG. 16 is a graph for representing a relationship between the offset value and an autocorrelation value.

For example, given that the size 103 and repetition size 104 of the first region 101 are 8 and 24 respectively, the autocorrelation value takes a peak value of 161 at the offset of 24. Accordingly, 24 can be determined to be the repetition size 104.

The position of the first region 101 and size 103 of the first region 101 are then determined. The repetition size 104 of the first region 101 has been determined on the basis of the autocorrelation value; however, the position of the first region 101 and the size 103 of the first region 101 should also be determined.

Figure 17:
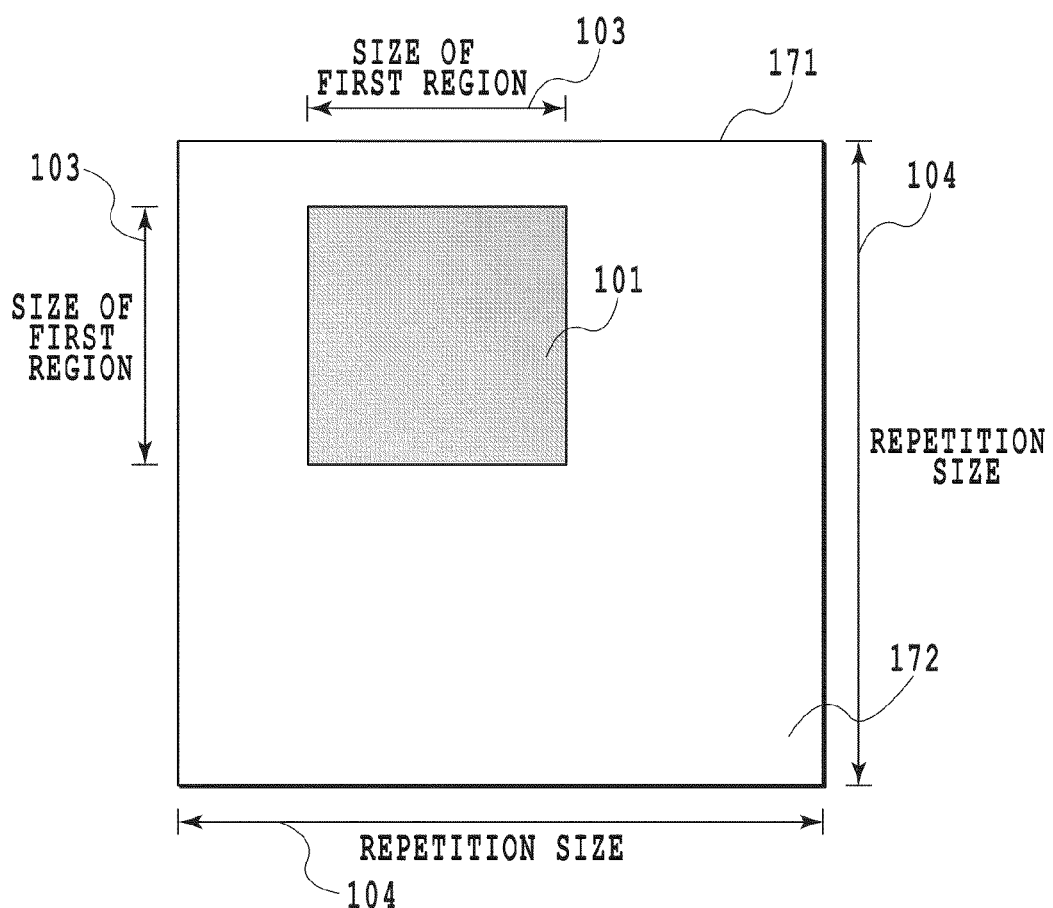
FIG. 17 is a diagram for illustrating a method for determining a position of the first region.

FIG. 17 is a diagram for describing a method for determining the position of the first region 101.

The repetition size 104 has been determined, so that any region having the repetition size is clipped from the relative coordinate list storing unit 135. Then, repetitive processing is performed as follows: a correlation of a region adjacent to the any region is obtained, and that of a region adjacent to the region is further obtained. A part corresponding to the first region 101 has high correlativity because the same data appears at intervals of the repetition size 104. The second region 102 has low correlativity because the same data does not appear at the intervals of the repetition size 104. Such characteristic is used to identify a starting position of the part with high correlativity as that of the first region 101, and determine a distance between the starting position and position opposite thereto of the part with high correlativity to be the size 103 of the first region 101.

Based on the position and size 103 of the first region 101 determined by the above processing, the additional information embedded in the first region is extracted. At this time, if the additional information is only extracted from a single region, false determination may be made due to measurement error or noise, so that positions of dot groups written in all of the first regions 101 are made up, and a mode value is employed to extract the additional information. The influence exerted by the noise or error cannot be eliminated at the time of extraction of the additional information, so that error correcting processing is applied to the extracted result. First, as described in FIG. 12, the displacement from the grid is extracted, and converted into data corresponding to the displaced position, and a data string embedded in the first region 101 is extracted. There are many error correction codes as well-known techniques; however, an LDPC (Low Density Parity Check) method is used here. It is known that the LDPC has very high error correcting capability, and exhibits characteristics close to the Shannon limit. However, a detailed description of the LDPC is omitted here. Alternatively, any method may be used if it is characterized by the error correction code. By using the error correction code, the embedded data can be extracted even if the extracted grid includes a certain degree of error or noise.

Further, as described along with the correction of the rotation angle, because the correction processing of the rotation angle is performed on the 90-degree basis, there are four possibilities, i.e., the extracted data is right one, or the right one rotated by 90 degrees, by 180 degrees, or by 270 degrees. Accordingly, the LDPC-based error corrections of the extracted data without rotation, rotated by 90 degrees, rotated by 180 degrees and rotated by 270 degrees are made. Only for a right rotation angle, the error correction code does work, and therefore the data can be normally extracted.

Based on the above processing, the first information embedded in the first region 101 can be extracted.

Next, the second region decoding unit 137 is described in detail.

Similarly to the case of the first region 101, the second region 102 is autocorrelated. Because the second region 102 is embedded at intervals of which a value corresponds to a multiple of the repetition interval of the first region, it is only necessary to perform the autocorrelating with any of the multiples of the repetition interval (e.g., 24, 48, 72, and so on) of the first region 101, so that the calculation may be omitted. Further, regarding the second region, the repetition size 105 and size of the second region 102 have the same value. As a result of the autocorrelating, the repetition size 105 of the second region is calculated from a mode value.

A starting position of the second region 102 is then identified. In order to synchronize the starting point of the first region 101 and that of the second region 102 with each other upon embedding, the starting position of the second region 102 can be limited to any of the starting points of the first regions 101.

To determine the position of the second region 102, the error correction code is used. Similarly to the case of the first region 101, the error correction code is also added to the second region 102 besides the embedded data. Because the size 105 of the second region 102 is known, the error correcting processing is performed with expectation sequentially from the starting position of the first region 101.

FIG. 17 is the diagram for describing the method for determining the position of the first region 101.

Figure 18:
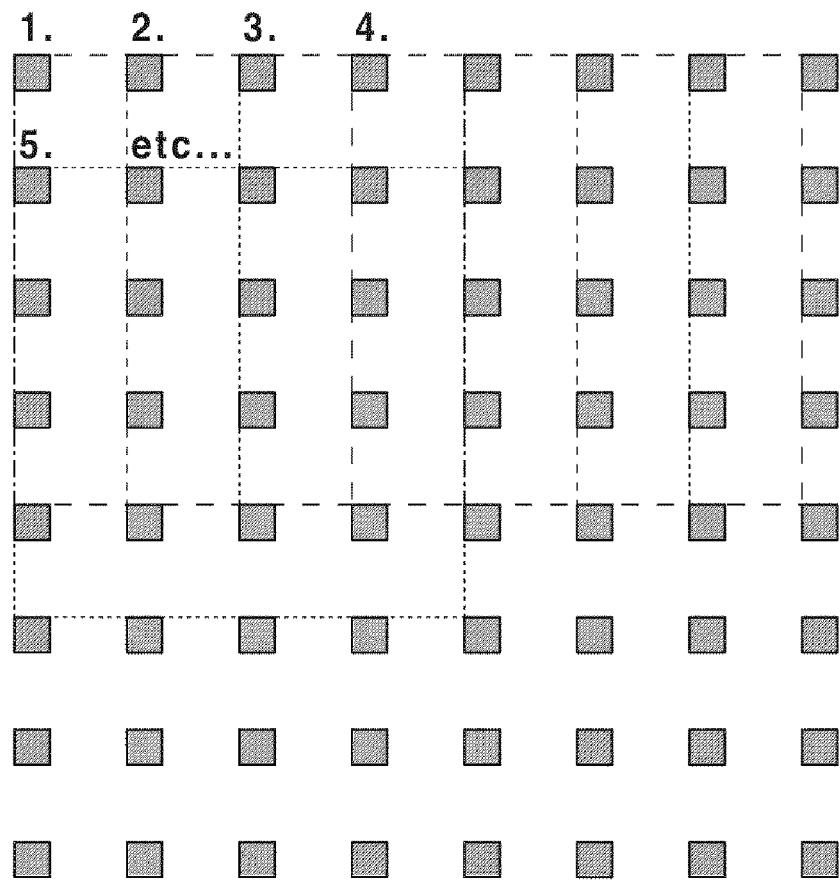
FIG. 18 is a diagram for illustrating a method for determining a position of the second region.

FIG. 18 is a diagram for explaining a method for determining the position of the second region 102.

FIG. 18 shows that the size 105 of the second region 102 is four times larger than the repetition interval of the first region 101. Because any of "4×4=16" is supposed to be the starting position of the second region 102, the error correcting processing is performed while shifting a position from 1, to 2, to 3, to 4, to 5, and so on. If the error correcting processing is successful, a position upon the success can be employed as the second region 102.

Based on the above processing, the second information embedded in the second region can be extracted.

Next, a method for forming the image embedded therein with the additional information with the use of the above-described information embedding technique is described.

Figure 19:
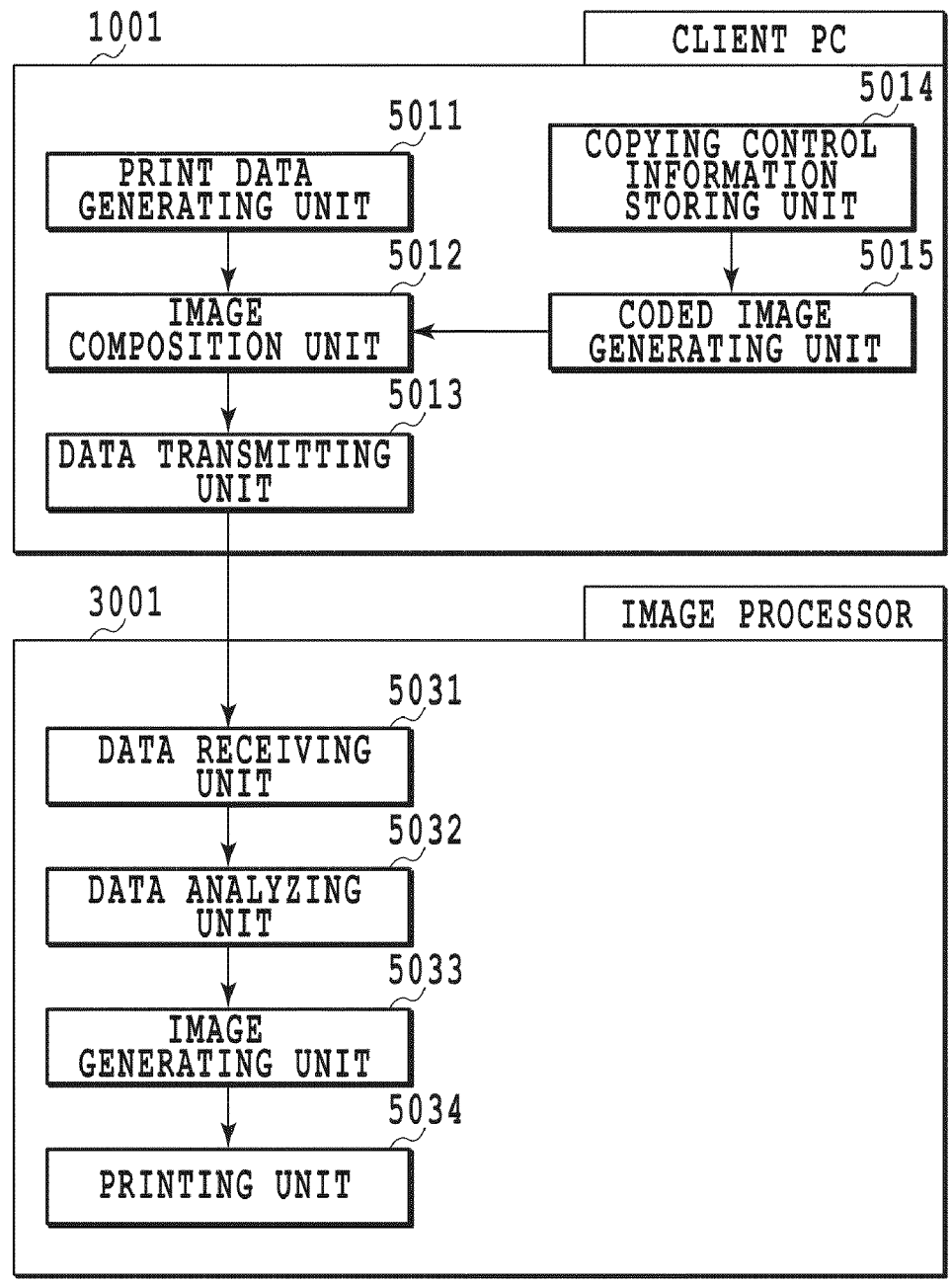
FIG. 19 is a block diagram for illustrating generation of image data embedded therein with the additional information.

FIG. 19 is a block diagram for explaining functions of the client PC 1001 and the image processor 3001.

The client PC 1001 comprises a print data generating unit 5011, an image composition unit 5012, a data transmitting unit 5013, a copying control information storing unit 5014, and a coded image generating unit 5015. The image processor 3001 comprises a Data receiving unit 5031, a data analyzing unit 5032, an image generating unit 5033, and a printing unit 5034.

Note that respective blocks illustrated in the diagram do not correspond to physical configurations of the client PC 1001 and the image processor 3001 one on one.

When the user issues a print instruction on the client PC 1001, the print data generating unit 5011 is activated. The print data generating unit 5011 is provided by a print subsystem in which a printer driver and an OS operate in conjunction with each other. The activated print data generating unit 5011 converts the document of which printing is instructed by the user into, for example, PDL (Page Description Language) print data. The print data generating unit 5011 sends the generated print data to the image composition unit 5012.

The copying control information storing unit 5014 once holds the copying control information set by the user via the security setting dialog box. Subsequently, according to the print instruction, the copying control information storing unit 5014 sends the copying control information to the coded image generating unit 5015.

Based on the received copying control information, the coded image generating unit 5015 uses the LVBC to generate with binary data the additional information to be embedded in the image. Regarding a data size of the additional information to be embedded with the use of the LVBC, for example, a data size of the first information is 8 bytes and that of the second information 200 bytes.

FIG. 21 shows the additional information to be embedded in the first region 101.

The first region 101 stores therein the identification information (ID), which is set for every print job. The identification information (ID) has a data size value of 8 bytes. The value of the identification information (ID) is determined on the basis of a random number that a printer driver generates for every print job. Note that if the print server 2001 is used, the identification information (ID) may have the value managed by the print server 2001.

FIG. 22 shows the additional information to be embedded in the second region 102.

The copying condition field 1902 stores therein the copying condition specified in the print security setting dialog box 31 of FIG. 3 by the user. The condition information type field 1903, data size field 1904, and condition information field 1905 are used if the user selects "Specify condition for permitting copy" within the print security setting dialog box 31 illustrated in FIG. 3. The condition information type field 1903 stores therein information indicating that data stored in the condition information field 1905 corresponds to the password, user name, or time limit. The data size field 1904 stores therein a size of the data stored in the condition information. The condition information field 1905 stores therein condition information to be used when the permission of copying is determined. If the condition information corresponds to the password, digital data corresponding to the password is stored. However, if the password itself is stored, the password may leak, so that a hash value calculated from the digital data corresponding to the password with the use of a hash function is stored. Accordingly, the condition information block field 1905 stores therein the hash value having a size of 20 bytes, which is calculated from the digital data corresponding to the password entered by the user. On the other hand, if the condition information corresponds to the user name, the condition information block field 1905 stores therein a character string corresponding to the user name entered by the user. If a plurality of users are permitted to copy, user names of the respective users are delimited by "," (commas) for the storing.

Based on the binary data additional information generated as described above, the coded image generating unit 5015 uses the above-described information embedding technique to generate a coded image corresponding to the background image formed of the dot groups. The generated coded-image is sent to the image composition unit 5012.

The image composition unit 5012 combines the print data received from the print data generating unit 5011 with the coded image corresponding to the background image received from the core image generating unit 5015. A composition method includes a method in which, for example, the background image is embedded in the PDL as overlay form information. Subsequently, the image composition unit 5012 sends the print data synthesized with the background image to the data transmitting unit 5013.

The data transmitting unit 5013 sends the print data to the image processor 3001. FIG. 19 illustrates a case where the print data is sent to the image processor 3001 without passing through a print server; however, it may be adapted to be sent to the image processor 3001 through the print server.

Next, operations of the image processor 3001 are described.

The Data receiving unit 5031 receives the print data including the print instruction via the Network interface 3306 (see FIG. 8). The Data receiving unit 5031 having received the print data sends the print data to the data analyzing unit 5032.

The data analyzing unit 5032 extracts a drawing instruction (PDL) from the received print data; interprets it; and converts it into intermediate data to be internally used by the image processor 3001. The data analyzing unit 5032 sends the intermediate data to the image generating unit 5033.

The image generating unit 5033 controls the RIP part 3308 (see FIG. 8) to convert the intermediate data into a bitmap image. After the compressing unit 3309 (see FIG. 8) has compressed the bitmap image, the image generating unit 5033 sends the compressed image to the printing unit 5034.

The printing unit 5034 controls the expansion unit 3315, printer image processing unit 3317, printer I/F 3318, and printer 3203, all illustrated in FIG. 8, to print the bitmap image on the paper.

Based on the above processing, the print output embedded therein with the additional information is obtained.

Note that, in the above description, the client PC 1001 is configured to generate the coded image embedded therein with the additional information; however, the image processor 3001 may be configured to generate the coded image. In such a case, the copying control information input by the user via the security setting dialog box in FIG. 3 is sent to the image processor 3001 as a part of the print instruction. The image processor 3001 generates the coded image on the basis of the copying control information. The image processor 3001 uses the above-described information embedding technique in the coded image generating unit 3316 to generate the coded image corresponding to the background image formed of the dot groups. Binary data corresponding to the copying control information to be embedded is generated in the coded image generating unit 3316; however, a method for generating it is the same as that performed on the client PC 1001. The image generating unit 5033 controls the printer image processing unit 3317 to combine the bitmap received from the expansion unit 3315 with the coded image received from the coded image generating unit 3316, and sends a bitmap corresponding to the composite image to the printing unit 5034. The printing unit 5034 controls the printer 3203 to print the received bitmap image on the paper.

OTHER EMBODIMENTS

The objective of the present invention may also be accomplished in such a way that a recording medium storing therein a program code for software actualizing the functions of the above-described embodiments is loaded in a system or device, and a computer such as the system reads and executes the program code stored in the recording medium. In such a case, the program code itself read from the recording medium actualizes the functions of the above-described embodiments, and the recording medium storing therein the program code constitutes the present invention. Also, an operating system (OS) or the like running on the computer may perform part or all of actual processing on the basis of instructions of the program code, and the processing may actualize the functions of the above-described embodiments. Alternatively, the program code read from the recording medium may be written in a function expansion card or function expanding unit of the computer, and then the function expansion card or the like may perform part or all of the processing on the basis of the instructions of the program code to thereby provide the above described embodiments.

If the present invention is applied to the above-mentioned recording medium, the recording medium stores therein the program code corresponding to the above-mentioned flowcharts.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2007-063478, filed Mar. 13, 2007, which is hereby incorporated by reference herein in its entirety.

What is claimed is:

1. An image processor comprising:
an extracting component for extracting information from a barcode in a first region of a current page; and
a determining component for determining the current page to be copy permitted or inhibited when the extracted information indicates conditional permission of copying, by extracting information corresponding to a condition from a barcode in a second region of the current page,
wherein the determining component applies a determined result of copying permitted or inhibited with regard to the current page to a next page without extracting information from a barcode in a second region of the next page when a document ID extracted from a barcode in a first region of the next page is identical to a document ID extracted from the barcode in the first region of the current page.

2. The image processor of claim 1, wherein each of the barcode in the first region and the barcode in the second region is a two-dimensional barcode.

3. An image processing method comprising:
an extracting step for extracting information from a barcode in a first region of a current page; and
a determining step for determining the current page to be copy permitted or inhibited when the extracted information indicates conditional permission of copying, by extracting information corresponding to a condition from a barcode in a second region of the current page,
wherein the determining step applies a determined result of copying permitted or inhibited with regard to the current page to a next page without extracting information from a barcode in a second region of the next page when a document ID extracted from a barcode in a first region of the next page is identical to a document ID extracted from the barcode in the first region of the current page.

4. A computer-readable recording medium causing a computer to execute an image processing method, the image processing method comprising:
an extracting step for extracting information from a barcode in a first region of a current page; and
a determining step for determining the current page to be copy permitted or inhibited when the extracted information indicates conditional permission of copying, by extracting information corresponding to a condition from a barcode in a second region of the current page,
wherein the determining step applies a determined result of copying permitted or inhibited with regard to the current page to a next page without extracting information from a barcode in a second region of the next page when a document ID extracted from a barcode in a first region of the next page is identical to a document ID extracted from the barcode of the first region in the current page.

* * * * *